(12) United States Patent
Karwowski et al.

(10) Patent No.: US 8,367,142 B2
(45) Date of Patent: *Feb. 5, 2013

(54) PRODUCTION OF SHREDDED OR FLAKED WHOLE GRAIN-CONTAINING COMPOSITE FOOD PRODUCTS

(75) Inventors: Jan Karwowski, Midland Park, NJ (US); Vani Vemulapalli, Morristown, NJ (US); Marie-Michelle Girard, Aurora, CA (US)

(73) Assignee: Kraft Foods Global Brands LLC, Northfield, IL (US)

( * ) Notice: Subject to any disclaimer, the term of this patent is extended or adjusted under 35 U.S.C. 154(b) by 459 days.

This patent is subject to a terminal disclaimer.

(21) Appl. No.: 11/382,306

(22) Filed: May 9, 2006

(65) Prior Publication Data

US 2006/0246202 A1    Nov. 2, 2006

Related U.S. Application Data

(63) Continuation-in-part of application No. 11/265,960, filed on Nov. 3, 2005, now Pat. No. 7,939,122, which is a continuation-in-part of application No. 11/119,077, filed on Apr. 29, 2005, now Pat. No. 7,964,233.

(51) Int. Cl.
*A23L 1/164* (2006.01)
(52) U.S. Cl. ........ 426/618; 426/452; 426/560; 426/620; 426/631; 426/462
(58) Field of Classification Search .................. 426/618, 426/619, 620, 621, 452, 462, 560, 431, 631
See application file for complete search history.

(56) References Cited

U.S. PATENT DOCUMENTS

| | | | |
|---|---|---|---|
| 240,900 A | 5/1881 | Pickett |
| 502,378 A | 8/1893 | Perky et al. |
| 548,086 A | 10/1895 | Perky |
| 713,795 A | 11/1902 | Perky |
| 820,899 A | 5/1906 | Williams |
| 897,181 A | 8/1908 | Williams |
| 901,647 A | 10/1908 | Richards |
| 931,243 A | 8/1909 | Williams |
| 987,088 A | 3/1911 | Perky |
| 991,584 A | 5/1911 | Williams |
| 1,019,831 A | 3/1912 | Perky |
| 1,021,473 A | 3/1912 | Perky |
| 1,060,702 A | 5/1913 | Perky |

(Continued)

FOREIGN PATENT DOCUMENTS

| | | |
|---|---|---|
| CA | 674046 | 11/1963 |
| EP | 1132010 A1 | 9/2001 |

(Continued)

OTHER PUBLICATIONS

Fast, Robert B. and Caldwell, Elwood F. Breakfast cereals, and how they are made. Chapters 2-3 and 6. St. Paul, Minn., USA : American Association of Cereal Chemists, c1990.*

(Continued)

*Primary Examiner* — Humera Sheikh
*Assistant Examiner* — Walter Moore
(74) *Attorney, Agent, or Firm* — Fitch, Even, Tabin & Flannery, LLC

(57) ABSTRACT

Shredded or flaked whole grain-containing composite food products, such as ready-to-eat cereals, and sweet and savory snacks, are continuously produced by pelletizing cooked, tempered, whole cereal grain particles in the presence of vegetables, fruit, or dairy cheese. In another aspect, an enrobing coating containing chocolate is applied to a baked shredded laminate product of the pelletization, wherein the shredded product may further optionally include fruit added and present during pelletization.

41 Claims, 1 Drawing Sheet

U.S. PATENT DOCUMENTS

| | | | | |
|---|---|---|---|---|
| 1,159,045 | A | 11/1915 | Kellogg | |
| 1,170,162 | A | 2/1916 | Kellogg | |
| 1,189,130 | A | 6/1916 | Kellogg | |
| 1,197,297 | A | 9/1916 | Kellogg | |
| 1,210,589 | A | 1/1917 | Black | |
| 1,946,803 | A | 2/1934 | McKay | |
| 2,008,024 | A | 7/1935 | Loose | |
| 2,013,003 | A | 9/1935 | Loose | |
| 2,421,216 | A | 5/1947 | Penty | |
| 2,576,670 | A | 11/1951 | Cohen | |
| 2,627,464 | A * | 2/1953 | Kehetian | 426/28 |
| 2,693,419 | A | 11/1954 | Gager | |
| 2,701,200 | A * | 2/1955 | Huber | 426/559 |
| 3,054,677 | A | 9/1962 | Graham, Jr. et al. | |
| 3,062,657 | A | 11/1962 | Vollink | |
| 3,462,277 | A | 8/1969 | Reinhart | |
| 3,512,990 | A | 5/1970 | Staybaugh | |
| 3,580,728 | A * | 5/1971 | Gulstad et al. | 426/289 |
| 3,732,109 | A | 5/1973 | Poat et al. | |
| 3,733,206 | A | 5/1973 | Jensen, Jr. | |
| 3,787,584 | A | 1/1974 | Hyldon | |
| 3,876,743 | A | 4/1975 | Soderlund et al. | |
| 3,956,517 | A | 5/1976 | Curry et al. | |
| 3,976,793 | A | 8/1976 | Olson et al. | |
| 3,983,261 | A | 9/1976 | Mendoza | |
| 4,004,035 | A | 1/1977 | Hirzel et al. | |
| 4,179,527 | A * | 12/1979 | White | 426/620 |
| 4,205,951 | A | 6/1980 | Sollich | |
| 4,251,551 | A * | 2/1981 | VanHulle et al. | 426/94 |
| 4,310,560 | A | 1/1982 | Doster et al. | |
| 4,528,202 | A | 7/1985 | Wang et al. | |
| 4,696,825 | A * | 9/1987 | Leibfred | 426/283 |
| 4,734,294 | A | 3/1988 | Spiel et al. | |
| 4,795,647 | A | 1/1989 | Leibfred | |
| 4,834,996 | A | 5/1989 | Fazzolare et al. | |
| 4,857,339 | A | 8/1989 | Maselli et al. | |
| 4,873,093 | A | 10/1989 | Fazzolare et al. | |
| 5,132,127 | A * | 7/1992 | Wisdom | 426/549 |
| 5,182,127 | A | 1/1993 | Schwab et al. | |
| 5,188,860 | A * | 2/1993 | Hemann et al. | 426/560 |
| 5,258,189 | A | 11/1993 | Efstathiou | |
| 5,338,556 | A | 8/1994 | Schwab et al. | |
| 5,368,870 | A * | 11/1994 | Efstathiou | 426/73 |
| 5,480,669 | A | 1/1996 | Zallie et al. | |
| 5,510,130 | A | 4/1996 | Holtz et al. | |
| 5,514,399 | A | 5/1996 | Cordera et al. | |
| 5,523,109 | A | 6/1996 | Hellweg et al. | |
| 5,595,774 | A | 1/1997 | Leibfred et al. | |
| 5,707,448 | A | 1/1998 | Cordera et al. | |
| 5,709,902 | A | 1/1998 | Bartolomei et al. | |
| 5,770,248 | A * | 6/1998 | Leibfred et al. | 426/93 |
| 5,874,120 | A * | 2/1999 | Borek et al. | 426/500 |
| 5,919,503 | A | 7/1999 | Leusner | |
| 6,004,612 | A * | 12/1999 | Andreski et al. | 426/618 |
| 6,149,965 | A | 11/2000 | van Lengerich et al. | |
| 6,291,008 | B1 | 9/2001 | Robie et al. | |
| 6,303,174 | B1 | 10/2001 | McNaught et al. | |
| 6,303,177 | B1 | 10/2001 | Ning et al. | |
| 6,746,702 | B1 | 6/2004 | Robie | |
| 6,746,707 | B2 | 6/2004 | Krysiak et al. | |
| 7,939,122 | B2 * | 5/2011 | Karwowski et al. | 426/560 |
| 7,964,233 | B2 * | 6/2011 | Karwowski et al. | 426/560 |
| 2001/0051198 | A1 | 12/2001 | Robie et al. | |
| 2002/0025367 | A1* | 2/2002 | Koehler et al. | 426/549 |
| 2003/0008049 | A1* | 1/2003 | Wilson et al. | 426/549 |
| 2003/0134010 | A1* | 7/2003 | Krysiak et al. | 426/94 |
| 2004/0166201 | A1 | 8/2004 | Nielsen et al. | |
| 2006/0246193 | A1 | 11/2006 | Karwowski et al. | |
| 2006/0246195 | A1 | 11/2006 | Karwowski et al. | |

FOREIGN PATENT DOCUMENTS

| | | |
|---|---|---|
| WO | WO 93/05665 | 4/1993 |
| WO | WO 94/18851 | 9/1994 |
| WO | WO 03/024242 A1 | 3/2003 |
| WO | WO 03/034838 A1 | 5/2003 |

OTHER PUBLICATIONS

"Crackers: How they Stack Up" (Nutrition Action Healthletter, Nov. 1, 2004; http://www.accessmylibrary.com/coms2/summary_0286-14341465_ITM.*

Nestle Coco Shreddies: http://web.archive.org/web/20040405074852/www.cerealpartners.co.uk/p_coco.aspx.*

Karim et al. Food Chemistry, vol. 71 (2000), pp. 9-36.*

In Dictionary of Food: International Food and Cooking Terms from A to Z. Retrieved on Oct. 29, 2010 from http://www.credoreference.com/entry/acbdictfood/temper_to; No month, 2005.*

Extended European Search Report for European Patent Application EP 06 11 3245 dated Aug. 14, 2006, 4 pages.

Fox et al., Cheese Chemistry, Physics and Microbiology, vol. 2 (2000), p. 8.

Extended European Search Report for European Patent Application EP 06 12 3435 dated Apr. 25, 2008, 6 pages.

Hegenbart, Scott, Mastering the Morning: Creating Breakfast Cereals, http://www.foodproductdesign.com/archive/1995/0795cs.html, Jul. 1995.

Fast, R. B., Breakfast Cereals and How They Are Made, AACC, USA, 1990, pp. 35-39.

* cited by examiner

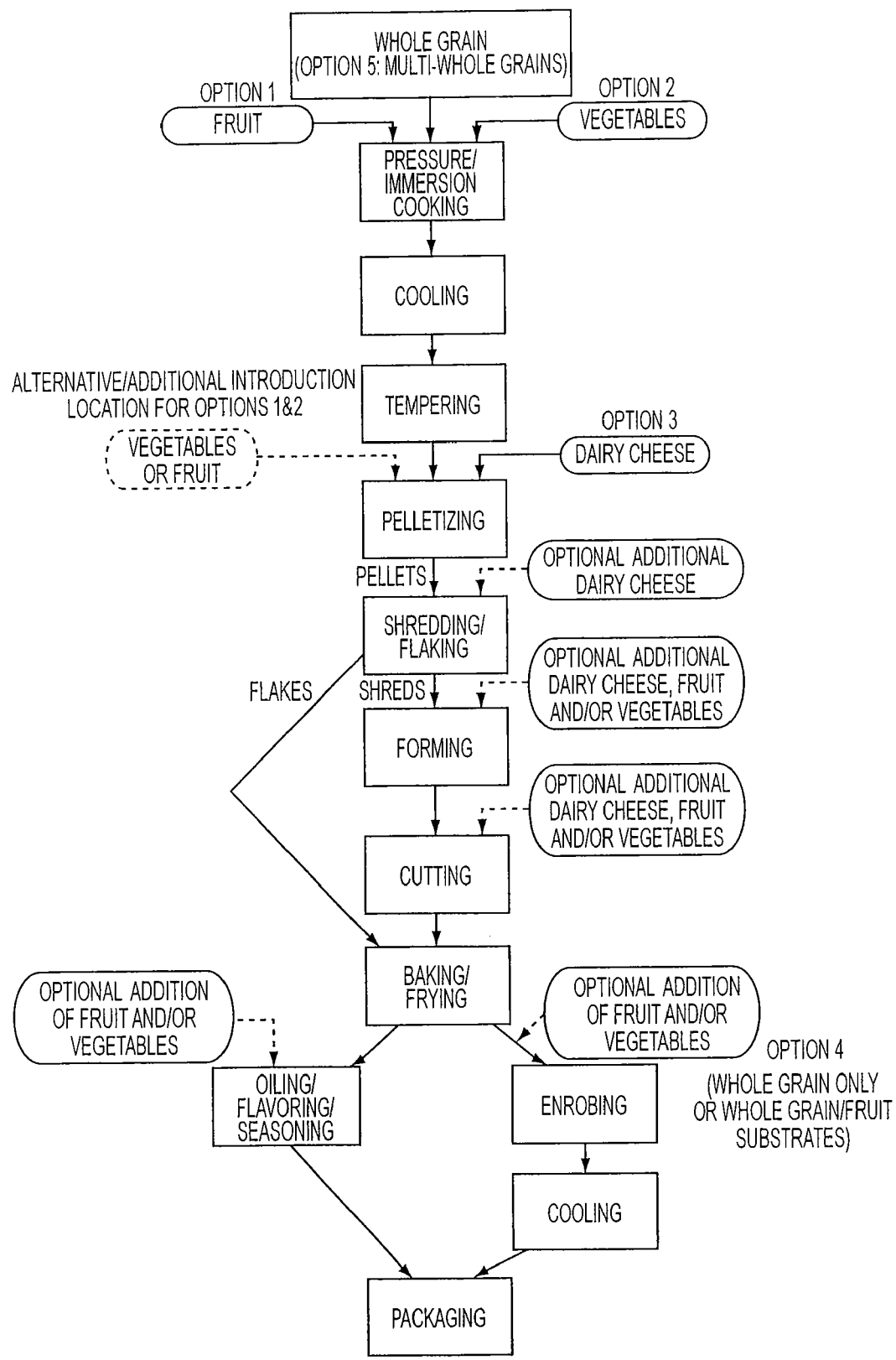

PRODUCTION OF SHREDDED OR FLAKED WHOLE GRAIN-CONTAINING COMPOSITE FOOD PRODUCTS

This patent application claims priority from and is a continuation-in-part application of U.S. application Ser. No. 11/265,960, entitled "Production of Whole Grain Shredded Products", now U.S. Pat. No. 7,939,122 B2 which was filed on Nov. 3, 2005, which is a continuation-in-part application of U.S. application Ser. No. 11/119,077, entitled "Production of Whole Grain Shredded Products", now U.S. Pat. No. 7,964,233 B2 which was filed on Apr. 29, 2005, and each of which is hereby incorporated by reference in its entirety.

FIELD OF THE INVENTION

The present invention relates to production of shredded or flaked composite food products, such as snacks and ready-to-eat cereals, from combinations of whole cereal grains and other food components.

BACKGROUND OF THE INVENTION

Whole cereal grains are nutritious and provide high dietary fiber content. Shredded products have been historically made with whole grain wheat. Generally, in the production of shredded wheat ready-to-eat cereal biscuits and shredded wheat wafers from whole grains, a plurality of shredded layers are laminated upon one other, and the laminate is cut, dockered, and baked to provide products having a distinctly visible shred pattern on their opposing major surfaces. The shreds provide visual attractiveness and a unique, crispy texture and connote a healthy, hearty, natural product. Also, the shreds provide increased surface area and deliver a robust flavor.

To prepare wheat for shredding, whole wheat berries are generally cooked and then tempered, using prolonged tempering times. Wheat is generally easy to shred over long periods after the cooking and tempering, for example up to about 24 hours after tempering. Whole wheat is unique in that it contains gluten which helps to retain water and to provide cohesiveness and elasticity during machining even after prolonged periods after tempering. However, the same is not true for other grains because of their lack of gluten and their unique chemical composition and changes that happen to the grains after cooking and tempering.

Starch-based compositions which have little or no gluten, when mixed with water, tend not to form dough that is cohesive at room temperature and continuously machinable or sheetable. Machinability of dough made from ingredients having little or no gluten may be improved by forming dough under elevated temperature conditions, such as by steaming the ingredients, as disclosed in U.S. Pat. Nos. 4,873,093 and 4,834,996 to Fazzolare et al. However, in the production of shredded products from cooked, tempered, non-glutenous whole grains such as corn, oats, rye, and barley, shreddability into long continuous shreds tends to decrease as tempering times increase or as the time between tempering and shredding increases. For example, cooked corn has a tendency to become hard and rubbery during the cooling and tempering process due, it is believed, to starch retrogradation. Also, storing of tempered corn in surge bins to accommodate mass production processes tends to increase starch retrogradation and hardness. The cooked, tempered cereal grains which become hardened or rubbery, tend to fracture during shredding or do not conform to shredding roll grooves for producing continuous, well-defined shredded net-like sheets.

In conventional processes for producing shredded cereals, the grain is cooked and then permitted to temper to increase shred strength. Tempering of the cooked grains prior to shredding has generally been considered necessary for obtaining strong, continuous shreds. In U.S. Pat. Nos. 548,086 and 1,159,045, cooked wheat or similar grains are subjected to tempering times of over 12 hours before shredding. As described in U.S. Pat. No. 4,179,527, in the manufacture of a whole wheat food product such as shredded wheat, whole wheat is cooked sufficiently to gelatinize the starch. Gelatinization is a function of water penetration into the whole berry, temperature, and time, for a given type of grain. According to U.S. Pat. No. 4,179,527, the gelatinization of wheat starch involves a destruction of bonds in the crystalline regions of starch granules. Retrogradation is the return of the starch molecules to a crystalline structure, which is different from the original crystalline structures, upon cooling. Tempering permits the gelatinized wheat starch to slowly cool and permits water migration through the wheat particles to achieve a uniform water distribution within the particles. Retrogradation occurs during tempering. According to U.S. Pat. No. 4,179,527, if shredding is attempted shortly after cooking, the insufficient degree of retrogradation or tempering results in at best, short noncontinuous strands and/or strands which are tough, curly, or suffer from other physical or textural disadvantage. In U.S. Pat. No. 4,179,527, the time required for the tempering of cooked whole wheat is substantially reduced by chilling the wheat at a temperature of from 1° C. to about 12° C.

It is believed that for wheat, the tempering permits distribution of water and facilitates development of the gluten into a network which provides cohesiveness for shredding. It is also believed that the retrogradation of wheat starch during tempering or after tempering is slow so as not to impede shredding or it forms a crystalline structure which permits shredding in the presence of gluten. Tempering of non-glutenous grains, such as corn, oats, rye, and barley also help to distribute water throughout the starch granules. It is believed that release of some soluble starch during cooking and distribution of the starch and water during tempering helps to provide cohesiveness. However, the amount released may be insufficient for continuous shreddability or starch retrogradation may be too rapid and may provide a crystalline structure which impedes shreddability into long continuous shreds.

Numerous other processes for producing shredded cereal products with reduced tempering times or without any apparent tempering is also known. Shredded cereal products, whether tempering is used or not, have also been produced by shredding the cereal in a form other than its cooked berry form.

International Patent Publication Nos. WO 03/034838 A1 and WO 03/024242 A1, and U.S. Patent Application Publication No. US 2004/0166201 A1 disclose the addition of an enzyme to starch-based raw materials to accelerate the retrogradation of starch and thus allow a shortening of the tempering step in the production of snack pellets and in the production of shredded cereals.

U.S. Pat. No. 6,303,177 and European Patent Application Publication No. EP 1,132,010 A1 disclose the production of a soy containing breakfast cereal by extrusion cooking a composition containing a soy material and a cereal grain to obtain a substantially gelatinized dough. A conventional pelletizer may be used to form dough beads from the cooked dough as it is extruded from the forming extruder. The pelletizer blades cut the dough extrudate rope into beads or pellets for further processing into flakes or shredded cereal. The dough beads may be dried to a moisture content of less than 18% and then the dried beads may be tempered for about 4 hours to about 10 hours before shredding.

U.S. Pat. No. 5,368,870 discloses fortifying a ready-to-eat cereal with beta carotene by adding to cooked tempered cereal grains prior to piece forming. Tempering times may range from approximately 2 hours to approximately 36 hours. The cooked cereals pieces may comprise cooked grains or fragments such as whole wheat berries or grits, corn cones, oat flakes, and the like. After fortification, the cooked tempered cereal pieces may be formed into pellets for flaking or may be shred in shredding rolls.

U.S. Pat. No. 5,182,127 and International Patent Publication No. WO 93/05665 disclose tempering of cooked cereal pellets or pieces for ready-to-eat cereals or cereal based snack half products by exposing the pellets or pieces to a high intensity microwave field for a brief time sufficient to improve moisture distribution therein but without causing the pellets or pieces to puff. The microwave tempered pellets or pieces may be flaked or shredded.

U.S. Pat. No. 4,528,202 discloses the production of the ready-to-eat shredded potato products by combining at least one potato starch source with water under low temperature and low shear mixing conditions so as to avoid overgelatinization of the potato starch and to form individual discrete dough pieces or particles, tempering the dough pieces for at least about two hours to distribute the water substantially uniformly throughout the dough pieces, shredding the tempered dough pieces, and cooking the shredded dough.

Processes where tempering is not specifically mentioned or is indicated as being optional in the production of cereals from wheat or other grains, are disclosed in U.S. Pat. Nos. 1,189,130, 2,008,024, 1,946,803, 502,378, 897,181, 3,062,657, 3,462,277, 3,732,109 and Canadian Patent No. 674,046.

In U.S. Pat. No. 1,189,130, thoroughly moistened bran, such as wheat bran, is mixed with up to 50% of whole wheat or other gelatinous cereal flour or starch-bearing material, and is cooked in pans in a steam retort. The cooked product is dried to a lumpy condition, the lumps are pressed through a vial mesh and the resulting rice sized lumps are then fed through shredding mills.

U.S. Pat. No. 2,008,024, a cereal biscuit is prepared by steaming or boiling wheat alone or with other forms of cereal or food material, surface drying the cooked product, and then converting it into a thin ribbed sheet. The shredding rolls are spaced sufficiently apart so that a sheeted material with ribs is obtained instead of a shredded product.

In U.S. Pat. No. 1,946,803, rice, alone or in combination with bran, is steam cooked, dried and cooled to a rubbery consistency, ground and optionally tempered to effect a uniform water distribution. This product is then passed between grooved rollers to form long flat ribbons. These ribbons are dried to produce a brittle product which is broken and then puffed by toasting.

In U.S. Pat. No. 502,378, a cereal grain is prepared for shredding by boiling, steaming, steeping or soaking. Depending upon the spacing between the rollers, a product in the form of threads, lace, ribbons, or sheets, and the like, is obtained.

In U.S. Pat. No. 897,181, cereal grain or vegetable in whole form is wetted but not cooked and then passed repeatedly between grooved rollers and then baked. Boiling or steaming of the grain or vegetable, it is disclosed, produces considerable change in its chemical quality and a number of the nutritious soluble elements escapes to the water.

In the processes of U.S. Pat. Nos. 3,062,657, 3,462,277, and 3,732,109, and Canadian Patent No. 674,046, a shredded product is not produced by means of shredding rolls. In U.S. Pat. No. 3,062,657, flour and water are mixed to form a dough in an extruder. The dough is cooked in the extruder and then tempered in the extruder at a lower temperature. The extrudates are cut into pellets to simulate cooked and dried grains such as corn grits, whole wheat berries, oat groats, rice and the like. The extrudates, it is disclosed, have a moisture content ideal for flaking. It is generally on the order of 18 to 24% by weight, the moisture being uniformly distributed throughout so that the necessity for tempering is entirely eliminated and the extrudate can be immediately transferred to a flaking operation. It is disclosed that it is preferable to further cool the extrudate before it enters the flaking device to optimize flaking properties.

In U.S. Pat. No. 3,462,277, a mixture of cereal flour or grits and water is passed through an extruder to gelatinize the starch while the dough is cooked and transformed into a rubber-like mass. The moisture content of the mixture is 13 to 35%. The continuous U-shaped extrudate is pinched off into segments by cutting rolls to form canoe-shaped cereal products. The separated canoe-shaped pieces are then dried to below 15% moisture.

U.S. Pat. No. 3,732,109, discloses the production of a ready-to-eat oat cereal biscuit by subjecting an oat flour-water mixture to a water boiling temperature and superatmospheric pressure to gelatinize a portion of the starch in the oat flour. The mixture then passes through an orifice and the extruded product is cut into small pieces. The flake-shaped pieces which are formed are dried to moisture content of from about 2% to about 6% by weight water. The dried flakes are then subdivided, admixed with a syrup, and compacted into the form of a biscuit. The formed biscuits are then dried to a moisture content of from about 4 to 5% by weight.

In Canadian Patent No. 674,046, a shredded dry oat cereal product is produced without the use of shredding rolls. Dough is cooked in a screw extruder, extruded through orifices to form a strand bundle, and the strand bundle is cut into pieces by a cutting device which may be a pair of rolls.

Processes for the production of shredded cereals from cereal grains wherein considerable tempering is used, as in the conventional process for the production of shredded wheat, are disclosed in U.S. Pat. Nos. 1,159,045, 1,170,162, 1,197,297, and 4,004,035. In U.S. Pat. Nos. 1,159,045, 1,170,162 and 1,197,297, the whole berry is pulverized so as to permit flavoring ingredients to be incorporated in the final product. A dough is formed from flour, flavoring, and water. The dough is then cooked, rolled into slabs and then atmospherically dried for a period of 24 to 40 hours. The dried product is toasted, broken into pea size pieces, dried and then shredded. In U.S. Pat. No. 4,004,035, shredded biscuits are formed by depositing a layer of shredded cereal in zig zag configuration on a moving belt to facilitate severing the material. In addition to whole wheat, other foods capable of being shredded, such as other cooked cereal, wheat germ, defatted soy, other vegetable protein, fruits, vegetable slurries and mixtures thereof may be employed in producing the biscuits. The food is softened by cooking and tempering prior to shredding.

In the production of shredded cereals by means of shredding rolls, obtaining the cooked cereal in a form which will produce continuous shreds is only one of several problems which are encountered.

Cooking to eliminate white centers in grains is taught in U.S. Pat. Nos. 2,421,216 and 4,734,294. In U.S. Pat. No. 2,421,216, particles of cereal grains such as corn, rye, wheat, bran, rice, or oat groats are composited with particles of de-fatted soya beans in the form of grits, flakes, or meal to enhance the protein content of the cereal by use of a two-stage pressure cooking step: The total cooking period to which the cereal component is subjected to should, according to U.S. Pat. No. 2,421,216, be such that the starches are hydrolyzed and highly dextrinized and the particles superficially. gelatinized with no free starch or white center. The cereal particles, it is taught, should also have a light adhesive action of the intermediately added soya bean particles. The mixed mass of cereal and soy which is removed from the cooker, is dried, then tempered for about 15 to 30 minutes before shredding in a shredding mill wherein the particles of soya become substantially uniformly spread out over and mixed with the cereal particles and adhered thereto by pressure through the shredding rolls.

U.S. Pat. No. 4,734,294 discloses a process for the production of shredded oat food products, such as ready-to-eat breakfast cereals having the shredded appearance and texture of shredded whole wheat. White streaks or spots in the final product, which result from uncooked grain or overcooked grain, are eliminated by pressure cooking the oats in at least two stages, the amount of water used in the first pressure cooking stage being limited to partially gelatinize the starch without substantial extraction of water soluble starches and gums to the surface of the oat particles. The amount of water used in the remaining pressure cooking stage or stages is sufficient to eliminate at least substantially all of the white portions in the oat particles and to provide water content in the oat particles which is sufficiently high to enable continuous shredding on shredding rollers. Additionally, the amount of water in each of the remaining stages is limited to avoid substantial extraction of the gums and water soluble starches to the surface of the partially cooked oat particle.

In U.S. Pat. No. 3,512,990 a dough, made from farinaceous materials such as wheat, corn, oats, rice, potatoes, or legumes, is optionally partially or completely cooked with added moisture, to an approximate moisture content of about 30%. After this cooking step, the mixture is rendered homogeneous by passing it through an extruder or a hammer mill, such as Fitzmill. The milled or extruded product is dried to an approximate moisture content of 22 to 24%. The dried dough is then compacted between two rolls to provide a shredding effect and produce a sheet of dough having diamond-like regularly spaced perforations. The sheet of dough is then severed into strips, folded to form small biscuits which are closed on three sides and then deep fried.

In U.S. Pat. Nos. 987,088, 1,019,831, and 1,021,473, corn or another grain is ground and immersed in an amount of water which is limited to that which will be taken up by the grain during cooking. The purpose of this is to preserve in the cooked article the aroma and other properties of the grain which might otherwise be carried off or dissipated by the evolution of steam or vapor. In these processes, the cooked dough is extruded through a perforated plate to obtain filaments.

In U.S. Pat. No. 4,310,560 particulate edible materials, including at least one material which acquires surface stickiness when moistened and a chemical leavening system are contacted with a spray of water and formed into pellets on a pelletizing disk. The edible material may include starches, such as those derived from wheat, corn, rice, potatoes, tapioca, and the like, including pregelatinized starches. The pellets are heated to a temperature sufficient to effect reaction of the leavening system to release carbon dioxide to provide the pellets with a porous cellular structure.

SUMMARY OF THE INVENTION

The present invention relates to production of whole grain-containing composite food products, such as and thin crispy chip-like snacks, ready-to-eat cereals, and enrobed food products, in shredded or flaked form from whole grains or multi-whole grain mixtures.

A method is provided in one embodiment for improving the shreddability or flakability of retrograded, whole cereal grain particles in producing a shredded or flaked composite food product, in which the method comprises pelletizing cooked and tempered, whole cereal grain particles that have undergone retrogradation to a hard, fracturable texture, in the presence of a food component selected from the group consisting of vegetables, fruits, and dairy cheese, to obtain whole-grain containing composite food pellets having soft, pliable texture which are ready for shredding or flaking while avoiding stickiness problems. The composite food pellets are shredded or flaked to provide shredded or flaked composite food pellets. In the instance of shreds, they additionally are formed into a shredded composite food laminate that is cut or otherwise divided into discrete shredded composite food pieces. The flaked composite food pellets or shredded composite food pieces are baked to provide a multi-flavored, nutritional shredded or flaked composite food product.

Fruit or vegetables, when used as the food component, are combined i) with whole cereal grain particles before or during cooking thereof, and/or ii) with cooked and tempered whole grain particles before completing the pelletizing step. Shearing and compaction of the combined tempered, cooked grain particles and food component in the pelletizer softens/plasticizes the matrix and generates enough of friction/heat to make it pliable, and less hard and rubbery, and ready for flaking or shredding while avoiding stickiness problems. In view of the observed soft, pliable characteristics of the resulting pellets, it is believed that the retrogradation of starch is reversed during the pelletization process. Moisture introduced via the fruit or vegetables, helps gelatinize starches present in the whole grain. External moisture requirements thus can be effectively reduced for the process operations. The pelletizing process also helps in eliminating problems otherwise associated with flaking or shredding grains such as oats or soy having relatively high fat content. The vegetables and fruits also impart a unique veggie or fruity taste, respectively, in the composite product, and serve as a natural source of vitamins and/or minerals, and other nutrients, to reduce macronutrient/micronutrient supplementation needs/costs and provide more bio-available forms of such naturally-delivered nutrients. The fruit, when used, may be selected from figs (prunes), bananas, citrus fruits, cranberries, apples, strawberries, blueberries, raspberries, peaches, apricots, pears, pineapples, oranges, grapes, and the like and any combination thereof. The vegetables, when used, may be selected from the group consisting of sweet potatoes, potatoes, cabbage, onions, carrots, spinach, broccoli, peas, beans, peppers, zucchini, okra, Brussels sprouts, cucumber, tomatoes, and the like and any combinations thereof. The fruit and vegetables may be used in the form of whole raw products thereof, whole frozen products thereof, whole evaporated products thereof, whole pre-cooked products thereof, whole juices thereof, whole purees thereof, whole powders thereof, and any combination thereof. The whole grain particles and fruit or vegetable food component may be combined in a mixing ratio of about 20:80 to about 95:05, and particularly about 40:60 to about 50:50, on a wt %:wt % basis, respectively, although the ratio may vary depending on the relative moisture and solids contents of the two ingredients.

Alternatively the food component may comprise dairy cheese, which is combined with cooked and tempered whole grain particles before completing the pelletizing step of the above-indicated method to provide a shredded or flaked composite product comprising grain material infused with cheese. In view of the soft, pliable attributes of the cheese-infused whole grain pellets, it also is believed that the retrogradation of starch is reversed during this pelletization process. This process also helps in eliminating or minimizing problems associated with flaking/shredding grains/seeds and cheese with high fat content. The composite products are a convenient form of delivery of both whole grains and real cheese in a ready-to-eat shelf-stable product. They have dual nutritional benefits derived from whole grain and dairy product contents. The dairy cheese particularly may have a moisture content of no greater than about 20 wt %. The dairy cheese may comprise Parmesan cheese, Romano cheese, Cheddar cheese, Swiss cheese, and the like and any combinations thereof. Optionally, the composite cheese-infused whole grain shredded products also can be baked with additionally-added cheese, which is incorporated in-between the shreds and/or added on top of the shreds before baking the product.

A method is provided in another embodiment for producing an enrobed, shredded composite food product, in which the method comprises pelletizing tempered, cooked, whole cereal grain particles which have undergone retrogradation to a hard, fracturable texture, and optionally in the presence of fruit, to obtain whole grain-containing pellets having a pliable texture, which pellets are shredded, formed into a shredded laminate that is cut or otherwise divided into discrete shredded food pieces, and then the discrete shredded food pieces are baked to provide baked, shredded food substrates, which are enrobed with a chocolate-containing coating to provide multi-textured, multi-flavored and nutritional enrobed, shredded composite food products. These composite products have wholesomeness of whole cereal grains combined with indulgence of chocolate. The texture of these composite products is unique in terms of bite and crunchiness.

The whole grains used in embodiments herein may comprise high-gluten whole grains such as wheat and/or non-glutenous or low-gluten content whole grains, e.g., corn, barley, rice, rye, oats, triticale. In a particular embodiment, the whole grains include non-glutenous or low-gluten content whole grains. These whole grains may be used singly or in multi-grain combinations thereof. Shredded and flaked composite products of embodiments of the invention include, e.g., whole grain shredded snacks and ready-to-eat cereals, made from one or more non-glutenous or low-gluten whole grains such as whole corn grains, oats, barley, rice, triticale, and rye. The method may also be employed with whole wheat alone or in combination with other whole grains to provide an enhanced crispy texture. In another embodiment of the invention, a whole grain, shredded chip-like snack having a substantially uniform shredded net like appearance and a crisp, shredded texture is obtained by substantially compressing a laminate of net-like sheets of the shredded composite pellets.

BRIEF DESCRIPTION OF THE DRAWINGS

FIG. 1 is a flow chart showing methodology of the present invention.

DETAILED DESCRIPTION OF THE INVENTION

The present invention provides a method for making shredded or flaked whole grain-containing composite products, such as sweet and savory snacks (e.g., chips, crackers, wafers, biscuits, enrobed shredded foods) and ready-to-eat cereals, and other food products. The products may be made with 100% whole grains and are an excellent source of whole grain nutrition and fiber. Cooked whole grains, such as corn and other non-gluten or low-gluten containing grains, when either processed alone or in combination with food components such as fruit, vegetables or dairy cheese, have a tendency to become hard and rubbery during the cooling and tempering process due to starch retrogradation. Shearing and compaction of whole grains in a pelletizer has been found to unexpectedly soften and plasticize the starch matrix and generate friction and heat to make the whole grain particles pliable and readily shreddable without stickiness problems in the shredding or flaking rolls. Moreover, this phenomenon is achieved even where disparate types of food are co-present with the cooked, tempered whole grains in the pelletizer, such as fruit, vegetables or dairy cheese. It is believed that in the process of the present invention, fracturing of at least substantially gelatinized, tempered starch granules to release amylose and amylopectin increases cohesiveness and softens whole cereal grain pieces for unexpectedly superior shreddability into continuous net-like sheets or superior flakability. As a consequence, starch retrogradation, it is believed, is reversed or amylose and amylopectin are released from the fractured starch granules during the pelletization process. The high shear, it is believed, substantially fractures retrograded starch granules to increase cohesiveness for shreddability or flakability. As a result, the pelletized whole grain, even if it incorporates fruit, vegetables or dairy cheese, is shreddable or flakable for a longer period of time after cooking. The difficulty with the shreddability or flakability of cooked and tempered grains, such as corn oats, barley, rice, triticale, and rye, either alone or when in combination with fruit, vegetables or dairy cheese, is overcome.

The process of the present invention provides versatility in terms of tempering times and post-tempering storage times for the production of nutritious, good source of fiber content, single whole grain or multi-whole grain shredded composite products. The pelletized cooked, tempered whole grains, and any incorporated fruit, vegetables or dairy cheese, are continuously shreddable into continuous net-like sheets, or flakable, even after prolonged tempering times or after prolonged periods in surge vessels after tempering during which substantial starch retrogradation may occur. The method of the present invention permits the use of fully cooked, tempered, but fracturable, hardened, rubbery whole cereal grain pieces, and composites of such grain pieces with fruit, vegetables or dairy cheese, in the continuous production of shredded or flaked products while achieving well defined shreds and a crisp texture and good source of fiber content. Whole wheat shredded composite products having an enhanced crispy texture can be produced using short temper times with excellent shreddability or flakability in accordance with the present invention.

Referring to FIG. 1, the flow chart shows a process scheme for making shredded or flaked whole grain-containing composite food products in accordance with various illustrative embodiments of the present invention. In the practice of particular embodiments herein, at least one of Options 1-5 indicated in FIG. 1 will be applied. Additional features of this method and options thereof will become more apparent from the descriptions that follow.

In one embodiment, indicated as Option 1 of FIG. 1, a unique procedure is provided for making flaked/shredded composite food products using various combinations of whole grains and whole fruits. The whole grains/seeds that can be used to make flaked/shredded products include wheat, rye, rice, corn, oats, barley, soy, and so forth. They can be used in combination with whole fruits such as figs (prunes), bananas, citrus fruits, cranberries, apples, strawberries, blueberries, raspberries, peaches, apricots, pears, pineapples, oranges, grapes, and so forth and combinations thereof. The procedure involves cooking of whole grains along with whole fruit, whole fruit purees, 100% fruit juices, whole frozen fruit, whole evaporated fruit, whole fruit powders, or combinations thereof, in a pressure cooker and then cooling and tempering the cooked material. Alternatively, the portions of the whole fruit may be selectively used, such as the flesh portions less seeds and/or skins. The cooked tempered whole grain and fruit material is fed into a pelletizer/extruder to form pellets. The pellets are fed into the flaking or shredding rolls to make flakes or shredded layers. Shredded products are formed, cut into desired shape, and then baked. Flakes are baked directly. Alternatively, or in addition thereto, cooked/pasteurized whole fruit puree or 100% fruit juices or whole fruit powders can be introduced directly into the pelletizer instead of adding the fruit component in the pressure cooker. In the matrix or between the shreds or topically, vitamins, minerals, flavors/seasonings, and other ingredients can be incorporated to further enhance the nutrition, taste, and texture of the composite products. In one particular embodiment, the method is used to make flaked/shredded products with 100% whole grains and 100% real (raw natural) whole fruits. This method also can be used to make cereals, baby foods, snack foods, and other products. In a particular embodiment, the combination of whole grain and fruit are in a mixing ratio of about 20:80 to about 95:05, and particularly about 40:60 to about 50:50, on a wt %:wt % basis, respectively, although the ratio may vary depending on the relative moisture and solids contents of the two ingredients. Optionally, the composite products also can have additionally-added fruit content incorporated after shredding/flaking and/or post baking.

The composited whole grain/fruit products are an excellent source of whole grains as well as good source of fiber. In addition the composite product offers unique nutritional health benefits derived both from whole grains and whole fruits. The fruits also serve as a natural source of vitamins and/or minerals, and other nutrients, to reduce macronutrient/micronutrient supplementation needs/costs and provide more bioavailable form of such naturally-delivered nutrients. As indicated, the tempered material containing whole grains and fruits has a tendency to become hard and rubbery during cooling due to starch retrogradation in grains. Shearing and compaction of the material in the pelletizer softens/plasticizes the matrix and generates enough of friction/heat to make it pliable and ready for flaking or shredding. In view of the soft, pliable pellet characteristics, the retrogradation of starch is thought to be reversed during the pelletization process in which cooked, tempered whole grains and fruits are used as co-feed materials. The pelletizing process also helps in eliminating problems associated with flaking/shredding grains/seeds such as oats or soy with high fat and high protein content, and sugars in the fruits. Moisture in fruits is used as a substrate to gelatinize grains without added water and thus developing unique fruity taste in the product. External moisture requirements thus can be effectively reduced for the process operations. The fruits develop and impart a unique fruity taste in the composite product. These composite products are a convenient form of delivery of both whole grains and whole fruits in a ready-to-eat shelf stable product. The whole grains and real fruits compliment each other in nutrition, texture, and overall eating properties. Among the health benefits of the composite products; they are an excellent source of whole grains, good source of fiber, low or zero trans fatty acid sources, low saturated fat sources, low or zero cholesterol sources, and can be made with low sodium content, and so forth.

Other advantages of this and other embodiments of the invention include the versatility that the procedure offers in terms of using whole/pre-ground whole grains, method of cooking, tempering time, flakability/shreddability, and ability to incorporate other ingredients to improve the functionality, nutrition, and overall acceptance of the products. In addition, by using of different cutter designs and flaking/shredding rolls patterns, the product geometry and pattern of flaked/shredded composite products of embodiments of this invention can be changed to make it interesting and fun for consumers.

In another embodiment, indicated as Option 2 of FIG. 1, a unique procedure is provided for making flaked/shredded products using various combinations of whole grains and real vegetables. The whole grains/seeds include those mentioned previously. They can be used in combination with vegetables such as onions, potatoes, sweet potatoes, cabbage, carrots, spinach, broccoli, peas, beans, peppers, zucchini, okra, Brussels sprouts, cucumber, tomatoes, and so forth and combinations thereof. Generally similar to the whole grain/fruit processing described above, this procedure involves cooking of whole grains and vegetables in a pressure cooker and then cooling and tempering the cooked material, which is then fed into a pelletizer/extruder to form pellets. The pellets also are fed into the flaking or shredding rolls to make flakes or shredded layers. Shredded layers are formed, cut into desired shape, and then baked. Flakes are baked directly. Alternatively, or in addition thereto, cooked and pasteurized vegetable purees/vegetable powders/frozen vegetables/evaporated vegetables/100% vegetable juices can be introduced directly into the pelletizer instead of adding in the pressure cooker. In the matrix or between the layers or topically, vitamins, minerals, herbs, caraway seeds, flavors/seasonings, and other ingredients can be incorporated to further enhance the nutrition, taste, and texture of the products. In one particular embodiment, this invention describes a unique procedure to make flaked/shredded products using 100% whole grains and 100% real (raw natural) vegetables. Alternatively, the portions of the whole vegetables may be selectively used, such as the flesh portions less seeds and/or skins. In a particular embodiment, the combination of whole grain and vegetables are in a mixing ratio of about 20:80 to about 95:05, and particularly about 40:60 to about 50:50, on a wt %:wt % basis, respectively, although the ratio may vary depending on the relative moisture and solids contents of the two ingredients.

The composited whole grain/vegetable products are an excellent source of whole grains as well as good source of fiber. In addition the product offers unique nutritional health benefits derived both from whole grains and real vegetables. As indicated, the tempered material containing whole grains and vegetables has a tendency to become hard and rubbery during cooling due to starch retrogradation in grains. Shearing and compaction of the material in the pelletizer softens/plasticizes the matrix and generates enough of friction/heat to make it pliable and ready for flaking or shredding. In view of the soft, pliable pellet characteristics, it is believed that the retrogradation of starch is reversed during the pelletization process in which cooked, tempered whole grains and vegetables are used as co-feed materials. The pelletizing process also helps in eliminating problems otherwise associated with flaking/shredding grains/seeds such as oats or soy with high fat content. Moisture introduced via the vegetables helps gelatinize starches present in the whole grain. External moisture requirements thus can be effectively reduced for the process operations. The vegetables develop and impart a unique veggie taste in the composite product. The composite products are a convenient form of delivery of both whole grains and whole fruits in a ready-to-eat shelf stable product. The vegetables and fruits also serve as a natural source of vitamins and/or minerals, and other nutrients, to reduce macronutrient/micronutrient supplementation needs/costs and provide more bioavailable form of such naturally-delivered nutrients. The whole grains and real vegetables compliment each other in nutrition, texture, and overall eating properties. Among the health benefits of the composite products; they are an excellent source of vitamins (e.g., Vitamin A via carrots, etc.), minerals, whole grains, good source of fiber, low or zero trans fatty acid sources, low saturated fat sources, low or zero cholesterol sources, and can be made with low sodium content, and so forth. Optionally, the composite products also can have additionally-added vegetable content incorporated after shredding/flaking and/or post baking.

In another embodiment, indicated as Option 3 of FIG. 1, a unique procedure is provided for making flaked/shredded products using various combinations of whole grains and dairy cheese. Dairy cheese is combined with cooked and tempered whole grain particles before completing the pelletizing step of the above-indicated method to provide a shredded or flaked composite product comprising grain material infused with real cheese. The pelletizing process helps in mixing and incorporating cheese into the tempered material. Shearing and compaction of the cooked tempered grain and cheese material in the pelletizer softens/plasticizes the matrix and generates enough of friction/heat to make it pliable and ready for flaking or shredding. In view of the soft, pliable attributes of the cheese-infused whole grain pellets, it also is believed that the retrogradation of starch is reversed during this pelletization process. This process also helps in eliminating or minimizing problems associated with flaking/shredding grains/seeds and cheese with high fat content. Optionally, the composite cheese-infused whole grain shredded products also can have additionally-added dairy cheese incorporated in-between the shreds and/or added on top of the shreds before baking the shredded product. In the matrix or between the shreds or topically on the baked product, vitamins, minerals, herbs/flavors/seasonings, and other ingredients also can be added to further enhance the nutrition, taste, and texture of these whole grain and cheese composite products. Flaked products are directly baked after the pelletizing step.

The whole grain and cheese composite products are a convenient form of delivery of both whole grains and real cheese in a ready-to-eat shelf-stable product. In a particular embodiment, this method makes flaked/shredded products using a combination of 100% whole grains and 100% dairy cheese. The products offers unique nutritional health benefits derived both from whole grains and real cheese.

The dairy cheese may comprise Parmesan cheese, Romano cheese, Cheddar cheese, Swiss cheese, and the like and any combinations thereof. In a particular embodiment, the dairy cheese comprises moisture content below about 20 wt %. Higher moisture content cheeses may be difficult to shred, and/or may boil out during baking if added between or on top of the shredded layers. Examples of lower moisture content cheeses that may be used include Parmesan cheese. Suitable dairy cheeses include so-called natural and aged cheeses produced by treatment of a dairy liquid with a clotting agent such as rennet, or a cheese-making culture, or by developing acidity to the isoelectric point of the casein, or a combination thereof. As known in the cheese making arts, the identity of the cheese product, and its characteristic flavor profile, texture and mouthfeel are governed by the particular cheese-making culture(s) or enzyme(s) chosen for the fermentation. The dairy liquid may be ripened by inoculating it with a starter culture (e.g., a lactic starter for cheddar cheese production) until a desired acidity is reached. The fermentation mixture can be provided by combining the ripened milk and rennet source, and fermenting the resulting mixture for a time and temperature sufficient to set the milk. The order of combination of these components can be varied. Following fermentation, the vitamin-fortified set milk can be processed in accordance with standard cheese making procedures used to remove whey by-product from the curd and form cheese product from the curd. For example, the set dairy liquid may be cut, cooked/heated, and whey is separated from the curd. After draining the whey, the curds may be subjected to cheddaring, milling, and salting. The salted curd can be hooped and pressed to remove additional whey. The desired flavor, aroma and texture of the cheese is obtained by ripening which involves holding the cheese over a period of time under controlled conditions (e.g., temperature, humidity). The term "ripening" is used herein synonymously with "curing" and "aging." The curd may be dressed, paraffin-coated, and/or packaged before ripening. After ripening, the cured cheese may be cut and directly used, or alternatively wrapped/packaged before use, in the methods of the present invention. The dairy cheese also may be commercially obtained.

In another embodiment, indicated as Option 4 of FIG. 1, a unique procedure is provided for making whole grain shredded products enrobed with chocolate. Baked, shredded products made with pelletized whole grain, and optionally fruit, in manners generally as described herein, are enrobed with chocolate, cooled, and packaged. These composite products have wholesomeness of whole cereal grains combined with indulgence of chocolate. The texture of these composite products is unique in terms of bite and crunchiness. Multi-textured, multi-flavored and nutritional enrobed, shredded composite food products are provided.

The chocolate-containing coating used to enrobe the baked shredded substrates can be real chocolate or compound/confectionery chocolate coating. The enrobing coating may be a standard compound coating used in confection or nutrition bar production. The chocolate coating can be made in bitter, bittersweet, light sweet, milk chocolate, and other imitation versions. Certain flavoring ingredients such as vanilla, vanillin, ethyl vanillin, spices, natural flavoring oils, and nut meals may be added to the coatings to further enhance the taste and texture of the products. The baked shredded substrates that are enrobed may be made with 100% whole grains and have all the goodness of whole grains. The baked shredded products to be enrobed can be made, e.g., with 100% whole wheat, 100% whole rye, 100% whole rice, 100% whole corn, 100% whole oats, 100% whole barley, 100% soy or multi whole grain combinations, and so forth. The shredded, baked substrate that is enrobed may be any such product described herein. In a particular embodiment, the baked, shredded substrate that is enrobed is a whole grain or multi-whole grain shredded product including fruit incorporated in accordance with another embodiment. These multi-textured composite products have additional positive notes of nutrition imparted by the fruit content. Alternatively, a multi-whole grain baked shredded product without fruit can be enrobed.

In a particular embodiment, various whole cereal grains may be used singly or in multi-grain combinations thereof to produce whole grain-containing shredded or flaked composite products in accordance with embodiments of the present invention. In one particular embodiment, indicated as Option 5 in FIG. 1, multi-whole grain shredded or flaked products are produced containing various combinations of multi grains/seeds. This procedure uses the same general cooking/tempering/pelletizing/shredding or flaking/forming/cutting/baking procedure described above with reference to the production of fruit and vegetable composite products but also includes multi-whole grain starting material. This method, as applied to multi-whole grains, involves cooking different types of grains by pressure cooking in a single stage, then cooling and tempering the cooked material before pelletizing and other post-pelletizing process steps described herein. All grains are cooked together in one step in a pressure cooker. The addition of multi grains in a single step helps to simplify the processing. The shredded products are made with 100% whole multi grains and are excellent source of whole grains with all the goodness of whole grains. The shredded composite products are also a good source of fiber. This method allows shredding or flaking of grains within five hours tempering time.

In one embodiment, examples of grains which may be used in the production of shredded or flaked composite products of the present invention are non-glutenous or low gluten content whole grains such as whole grain corn or corn kernels, oats or oat groats, barley, rye, rice, triticale, and mixtures thereof. In a particular embodiment, the whole grains processed using methods of the invention comprise non-glutenous or low-gluten content whole grains, singly or in combinations thereof, which consist of less than about 4 wt %, particularly less than about 3 wt %, and more particularly less than about 1 wt %, total gluten content thereof. A particular whole grain for use in the present invention is corn. The corn may be of the yellow, white or blue variety or mixtures thereof. High gluten content grains, such as wheat, may also be shredded or flaked in accordance with methods of the present invention. For example, in embodiments of the invention, any whole grain wheat, such as whole grain soft/hard/durum wheat, or wheat berries may be used alone or in combination with one or more non-glutenous or low gluten content whole grains. In embodiments of the invention, whole grains, which are at least partially or fully defatted, such as defatted whole wheat berries, may be used alone or in admixture with full-fatted whole grains. In the production of multi-grain products, each whole grain may be employed in equal weight percentages or in different weight percentages.

The whole cereal grain particles employed may be in the form of the raw, whole, non-comminuted grain or berry or in the form of pre-cut, pre-ground, or comminuted whole grains. For example, the whole grain particles may be in the form of whole corn kernels, or pre-ground or comminuted corn kernels. Whole oat particles may be in the form of whole oat grains or berries, or pre-ground or pre-cut whole oat grains. The starch of the whole grain particles employed in the present invention may be all or essentially all individual, crystalline starch granules, as determined by light microscopy starch characterization where a sample is stained with Lugol's Iodine and observed in Brightfield optics.

Although preferred in embodiments, the present invention is not limited to whole grains as the sole type of grain source that may be used in the production of the shredded or flaked composite products. Shredded or flaked composite products also may be made using methods of the invention from grain sources containing at least in part non-whole grain ingredients (e.g., meals, grits, flours, starches, etc.). In addition, products optionally may be made without precooking the composite doughs before pelletizing them. That is, the doughs into which the fruit, vegetable or cheese is incorporated in the pelletized intermediate material alternatively may be doughs made from flours that are not heat treated, pre-cooked and dried (e.g., masa flour, pregelatinized flour, partially gelatinized flour, presoaked and dried flour, toasted flour, other heat treated uncooked flour, etc.).

In embodiments of the present invention pre-ground or comminuted whole cereal grains are preferred because they hydrate and cook faster than whole grains or whole berries. For example, prior to cooking, whole cereal grains, such as whole corn kernels, may be pre-ground, milled or comminuted to a particle size of less than or equal to about ¼ inch, preferably less than or equal to about 0.2 inch, for example from about 0.05 inch to about 0.188 inch. In embodiments of the invention, comminuting, pre-grinding or milling of raw whole grains may be achieved using a conventional Fitz mill, Commitrol mill, or Urschel mill. For example, a Fitz Mill having a ⅛ inch round hole screen may be employed to obtain an average particle size distribution of about: 0.0% on a #6 screen, about 14.91% on a #14 screen, about 30.43% on a #20 screen, about 50.25% on a #40 screen, and about 4.41% on the pan.

In embodiments of the present invention, whole seeds or comminuted seeds or legumes, such as soy beans or soy bean grits may be admixed with the cereal grains to enhance protein content of the products of the present invention in amount which does not adversely affect shreddability or flakability. Exemplary amounts of the seeds or legumes which may be employed may range up to about 60% by weight, based upon the total weight of the whole cereal grains.

In particular embodiments where the whole cereal grains include whole corn, lime is preferably employed to enhance flavor and also to enhance starch functionality and cohesiveness. Any food-grade lime or calcium hydroxide may be used in the present invention. The lime may be added in an amount sufficient to improve starch functionality and reduce tackiness of the corn-based composition, and to provide a masa flavor to the final product. Exemplary amounts of lime which may be used in embodiments of the present invention are from about 0.01% by weight to about 3% by weight, preferably from about 0.1% by weight to about 0.5% by weight, based upon the weight of the whole corn grains or kernels. Lime may be used alone or in combination with other quick cooking agents (such as disodium phosphate).

As can be appreciated from the above descriptions, in particular embodiments indicated in FIG. 1, Option 1 (fruit) may be used alone or in combination with one or both of Option 4 (enrobing) and Option 5 (multi-grain); Option 2 (vegetables), or Option 3 (dairy cheese), each may be used alone or in combination with Option 5; and Option 4 may be used alone or in combination with Option 1 or Option 5, or as combined with both Options 1 and 5; and Option 5 may be used alone, or in combination with any one of Options 1, 2, 3 or 4, or as combined with both Options 1 and 4.

Shredded or flaked whole grain-containing foods, such as ready-to-eat cereals, crackers, wafers, biscuits, or snack chips, of methods of the present invention may be full-fat, reduced fat, low-fat, or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for cookies, the reference amount is 30 grams. Thus, the fat content of a low-fat cracker, wafer, or cookie would therefore be less than or equal to 3 grams of fat per 50 grams or less than or equal to about 6% by weight fat, based upon the total weight of the final product. A no-fat accompaniment cracker would have a fat content of less than 0.5 grams per 15 grams or less than about 3.33% by weight, based upon the weight of the final product. A no-fat wafer having a label serving size of 32 grams would have a fat content of less than 0.5 grams per 32 grams or less than about 1.56% by weight, based upon the weight of the final product.

Oleaginous compositions which may be used in producing full-fat, reduced fat, or low-fat shredded products in accordance with the present invention may include any known shortening or fat blends or compositions useful for baking or frying applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from any vegetable sources such as soybean oil, palm kernel oil, palm oil, rapeseed oil, safflower oil, sesame oil, sunflower seed oil, canola oil, corn oil, olive oil and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention include partially hydrogenated soybean oil, palm oil, and mixtures thereof.

In embodiments of the invention, the amount of vegetable shortening or fat topically applied to shredded products may be reduced by more than 25 percent by weight to obtain reduced fat products having, for example, less than about 20% weight percent fat, preferably less than 10% by weight fat, based on the total weight of the baked or fried, finished product.

To provide a more lubricious mouthfeel to reduced fat, low-fat or no-fat products, a hydrocolloid gum, preferably guar gum, may be employed to compensate for the fat reduction as disclosed in U.S. Pat. No. 5,595,774 to Leibfred et al., the disclosure of which is herein incorporated by reference in its entirety. As disclosed in U.S. Pat. No. 5,595,774, the hydrocolloid gums are used in effective amounts which provide a lubricous, smooth, non-slippery mouthfeel to the baked or fried product. Exemplary amounts of the hydrocolloid gum, preferably guar gum, which may be used range from about 0.15% by weight to about 1.5% by weight, preferably from about 0.25% by weight to about 0.45% by weight, based upon the total weight of the whole berries or grains. Other gums which may be used with guar gum include xanthan gum and carboxymethyl cellulose, and gums which form gels such as alginate gum, carrageenan gum, gum arabic, gum tragacanth, pectin, and locust bean gum, and mixtures thereof. Generally, the greater the extent of shortening or fat reduction, the greater the amount of gum utilized to compensate for the loss of lubricity or loss of smoothness in mouthfeel.

In one method of the present invention, a whole grain shredded or flaked composite food product may be produced continuously on a mass production basis by admixing whole cereal grain particles with water, and optionally fruit or vegetables, and pressure cooking the whole grain particles to at least substantially gelatinize starch of the whole grain particles, and tempering the cooked, whole grain particles. The cooked and tempered whole grain particles may be pelletized in a pelletizer in the presence of fruit, vegetables, or dairy cheese to obtain whole grain-containing pellets, the pelletizing being under pressure and temperature conditions to provide continuous shreddability of the whole grain pellets into continuous net-like sheets. The whole grain-containing pellets may be shredded into whole grain net-like sheets, followed by laminating the whole grain net-like sheets to obtain a whole grain laminate. The whole grain laminate may be cut into whole grain pieces followed by baking or frying the whole grain pieces to obtain a whole grain-containing shredded composite food product. In embodiments where a thin, chip-like shredded snack is produced, the whole grain laminate may be substantially compressed to obtain a compressed laminate having a shredded net-like appearance, followed by cutting the compressed laminate into pieces and baking or frying of the pieces to provide a multi-flavored, nutritional shredded or flaked composite food product. In another method, an enrobed, shredded composite food product is produced by pelletizing cooked and tempered whole cereal grain particles which have undergone retrogradation to a hard, fracturable texture, and optionally in the presence of fruit, to obtain food pellets having a pliable texture, which pellets are shredded, formed into a shredded laminate that is cut or otherwise divided into discrete shredded food pieces, and then the discrete shredded food pieces are baked to provide baked, shredded food substrates, which are enrobed with a chocolate-containing coating and then cooled to provide multi-textured, multi-flavored and nutritional enrobed, shredded composite food products.

The cooking of the grain or berry according to this invention can be done in any standard cooking equipment, such as a rotary cooker, immersion cooker, or pressure cooker, such as a Lauhoff pressure cooker. Immersion cooking is generally at about atmospheric pressure or only about 2-3 psig. Pressure cooking is preferred because it quickly achieves full cooking or gelatinization of the whole grain particles with no, or essentially no white centers The whole grain particles may be cooked at temperatures and humidities which hydrate and at least substantially gelatinize the internal structure of the grains or berries such that only a pin head of white or free starch remains visible in the center of the kernel. In embodiments of the invention, the degree of gelatinization may for example, be at least 90%. In preferred embodiments the starch is essentially 100% gelatinized leaving no visible white centers in the whole grain particles. The degree of starch gelatinization may be measured by differential scanning calorimetry (DSC). Generally, starch gelatinization occurs when: a) water in a sufficient amount, generally at least about 25 to 30% by weight, based upon the weight of the starch, is added to and mixed with starch and, b) the temperature of the starch-water mixture is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule, manifested in irreversible changes in properties such as granular swelling, native-crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second stage phenomenon following gelatinization in the dissolution of starch. It involves increased granular swelling, exudation of molecular components (i.e., amylose, followed by amylopectin) from the granules, and eventually, total disruption of the granules. See Atwell et al., "The Terminology And Methodology Associated With Basic Starch Phenomena," *Cereal Foods World. Vol.* 33, No.3, Pgs. 306-311 (March 1988).

Exemplary immersion cooking temperatures may range from about 190° F. to about 212° F. Immersion cooking of the whole grain particles may occur at about 210° F. at atmospheric pressure using steam for about 30 to about 36 minutes. The cooking can include a "come-up time" of between 6.5 to about 8 minutes during which the temperature of the grain in the vat or cooking vessel is elevated from ambient temperature to the cooking temperature. But preferably, before cooking, the whole grain particles are added to hot water at a temperature of about 170° to 190° F. in the cooker. The whole grain particles may be added to the hot water in a rotating cooker, for example, over a time period of about 50 to about 100 seconds.

The amount of water used in the immersion cooking step may range from about 28% by weight to about 70% by weight based upon the total weight of the grains or berries and added water. The moisture content of the cooked grain, after draining may range from about 29% by weight to about 60% by weight, preferably from about 29% by weight to about 42% by weight.

In preferred embodiments, where pressure cooking with direct steam injection is employed, pressure cooking temperatures may be at least about 235° F., preferably at least about 250° F., most preferably from about 268° F. to about 275° F. Exemplary pressure cooking pressures may range from about 15 psig to about 30 psig, preferably from about 20 psig to about 28 psig with cooking times ranging from about 15 minutes to about 45 minutes, preferably from about 20 minutes to about 30 minutes. The pressure cooking may include a "come-up time" as in immersion cooking of between 6.5 to about 8 minutes during which the temperature of the grain in the vat or cooking vessel is elevated from ambient temperature to the cooking temperature. But preferably, before cooking, the whole grain particles are admixed with hot water at a temperature of about 170° to 190° F. in the pressure cooker. The whole grain particles may be added to the hot water, or vice versa, in a rotating cooker, for example, over a time period of about 50 to about 100 seconds. Fruit or vegetables, and other ingredients such as salt and lime in the case of corn grain cooking, may be added in the cooker with the water as a pre-blend or added separately.

Pressure cooking is preferred over immersion cooking because it provides better control over obtaining a desired water content in the cooked whole grain particles and reduces or eliminates the need for drying of the cooked grain particles to achieve a desired moisture content for shredding. Generally, in pressure cooking all of the water added is absorbed or taken up by the whole grain particles. In addition, steam which is directly injected into the pressure cooker condenses and is taken up by the whole grain particles, generally in an amount of about 1% by weight to about 3% by weight, based upon the total weight of the cooked whole grain particles. Generally, draining of water after pressure cooking is not needed because all or substantially all of the added water and steam condensate is taken up by the cooked whole grain particles.

The amount of water added in the pressure cooking step, not including steam condensate, may range from about 12% by weight to about 30% by weight based upon the total weight of the grains or berries and added water. If moisture-containing fruit or vegetables are included in the mixture that is cooked, the moisture content thereof can effectively reduce external moisture requirements for cooking. The moisture content of the cooked grain, which includes water inherently present in the raw grain, after draining if needed, may range from about 29% by weight to about 42% by weight preferably from about 33% by weight to about 38% by weight, based upon the weight of the cooked whole grain particles.

During cooking, moisture tends to collect on the grain particles or berries. This moisture can increase the stickiness of the cooked grain and can cause handling problems when the grain is transferred to other apparatus. Mixing the grain in the cooking vat at low rotation speeds provides for even cooking and reduces lumping.

After draining of any excess cooking water and steam condensate formed during cooking, the cooked whole grain particles, and any cooked fruit or vegetable portions present, may be discharged from the rotating cooker and optionally transferred to a surface dryer and cooler. In embodiments of the invention, the cooked whole grain particles may be dried and cooled to a temperature of less than about 135° F., for example from about 60° F. to about 85° F. The surface drying and cooling facilitates flow of the cooked grains as individual, discrete pieces. The dried, cooled whole grain particles may have moisture content of from about 29% by weight to about 42% by weight, preferably from about 33% by weight to about 38% by weight for shreddability into strong, continuous shreds.

In preferred embodiments, the cooked whole cereal grain particles and any other food components present are passed through a lump breaker to break apart large lumps or agglomerates of whole cereal grain particles. The de-lumped whole cereal grain particles may then be co-milled to obtain smaller agglomerates of whole cereal grain particles by passing through a screen, for example a 1 inch square screen. The co-milled agglomerates may range in size from about golf-ball sized to granular sized, preferably less than about 0.5 cm in diameter.

After cooking, the starch granules of the cooked whole cereal grain particles are no longer crystalline in nature and are swollen or larger in size, as determined by light microscopy starch characterization using Lugol's Iodine. The cooked particles may contain swollen granules as well as agglomerated starch clusters.

The cooked whole cereal grain particles, along with any other food components present, may then be conveyed to a surge bin or grit bin for tempering. The cooked whole grain particles may then be tempered or cured for a sufficient period of time to provide a uniform distribution of the water throughout the cooked whole grain particles. Tempering may be conducted at a temperature of less than about 135° F., preferably from about 60° F. to about 100° F., more preferably from about 80° F. to about 90° F. Tempering times may range from about 0.5 hours to about 5 hours, preferably from about 1 hour to about 4 hours. The tempering or curing step may be accomplished in one or more stages. The tempered whole grain particles may be in agglomerated form, with the agglomerates ranging in size from about golf-ball sized to granular sized, preferably less than about 0.5 cm in diameter. These agglomerates incorporate and include any fruit or vegetable portions present.

In embodiments where a hydrocolloid gum is used, as disclosed in U.S. Pat. No. 5,595,774, the hydrocolloid gum, preferably guar gum, in dry, particulate, or powdered form may be admixed or blended with the cooked, tempered whole grain particles. Batch or continuous mixers or blenders can be used to mix the gum and the cooked, tempered whole grain particles or agglomerates to coat them with the gum substantially homogeneously. The dry gum sticks or adheres to the cooked, tempered moist grains, thus at least partially coating the grains without creating a sticky surface which would hamper or interfere with shredding. Upon pelletizing and shredding of the grains or berries, the gum coating or particles are incorporated into and onto the individual strands or net-like sheets of dough formed by the shredding rolls.

The cooked, tempered whole grain particles, and any other food components present, may be transferred by means of belt conveyers to a pelletizer for forming them into pellets for shredding or flaking. Upon entering the pelletizer, the tempered whole grain particles may be in the form of agglomerates. The agglomerates fed to the pelletizer may range in size from about golf-ball sized to granular sized, and may preferably be less than about 0.5 cm in diameter. They may have a temperature of less than about 135° F., preferably from about 75° F. to about 100° F., more preferably from about 80° F. to about 90° F. Upon entry into the pelletizer, the tempered, whole grain particles may have a hard or rubbery texture. The starch of the tempered whole grain particles may be retrograded, with the starch being primarily granular, the starch granules being swollen, and some agglomerated starch clusters being present, as determined using light microscopy starch characterization with Lugol's Iodine.

Commercially available extruders or pelletizers, such as a Bonnet or a Wenger pelletizer may be employed to produce the shreddable, whole grain pellets from the agglomerates of cooked, tempered whole grain particles in the present invention. The pelletizer may be equipped with a solid or cut-flight screw conveyer for conveying and shearing of the tempered whole grain particles from the input end to the output end and through the exit die plate. Cooling jackets are preferably provided to control the temperature of the agglomerates in the pelletizer and to control the temperature of the pellets exiting the pelletizer. The cooling jackets help to remove heat generated by the shearing action occurring in the pelletizer and at the die plate as the agglomerates are forced through the die plate apertures.

The pelletizer may be equipped with an internal knife installed on the upstream side of an exit die plate, and an external knife installed on the downstream side of the exit die plate for forming the whole grain agglomerates into a rope or rod which is cut into whole grain pellets. In embodiments of the invention, the die plate may have a plurality of holes or apertures each having a diameter of about 3/16 inch to about 5/16 inch. The open area of the die plate, or the total area of the apertures as a percentage of the die plate area, may range from about 14% to about 55%, preferably from about 25% to about 45%, more preferably from about 38% to about 42%.

The whole grain pellets may be produced with dimensions for shredding on conventional shredding equipment. For example, the pellets may have a cut length of about 1/8 inch to about 1/4 inch, and a diameter of about 3/16 inch to about 5/16 inch imparted by the die apertures.

In accordance with the method of the present invention, the pelletizing pressure, as measured at the die plate, may be from about 200 psig to about 700 psig, preferably from about 400 psig to about 500 psig. The pressures and temperatures employed preferably result in no or substantially no expansion of the extrudate exiting the die orifices. Also, the temperature of the pellets exiting the pelletizer should be sufficiently low so that any increase in temperature caused by the shredding operation does not result in deleterious sticking of the shreds to the downstream shredding rolls or compacting rolls.

Generally, the temperature of the shredded product out of the shredding rolls may be up to about 120° F. to about 135° F. without substantial sticking problems. The pelletizing temperature may be controlled by use of the cooling jackets to provide a pellet temperature of from about 80° F. to about 135° F., preferably from about 90° F. to about 110° F., for example from about 90° F. to about 110° F., for example from about 95° F. to about 105° F., upon exiting the pelletizer die plate. In embodiments of the invention, cooling air may be supplied at the exit of the plate to cool the exiting pellets to help avoid stickiness problems.

The pellets exiting the pelletizer have a soft, pliable, cohesive texture. The pelletization is believed to reverse retrogradation of the tempered whole grain particles. High shear in the pelletizer, it is believed, substantially fractures retrograded starch granules and releases amylose and amylopectin to increase cohesiveness for shreddability into continuous net-like sheets. While the starch entering the pelletizer may be primarily granular, it may be quite different in the pellets exiting the pelletizer. The starch of the whole grain pellets produced by the pelletizer is primarily agglomerated starch and fragmented starch with only a small population of individual granules, as determined using light microscopy starch characterization with Lugol's Iodine.

Upon exiting the pelletizer, the cooling of the pellets should not be so extensive, and the pellets should not be permitted to sit or temper too long, so as to induce substantial starch retrogradation or pellet hardening which may impede shreddability.

In addition to the use of a pelletizer, other means, such as double shredding, may be employed to shear the cooked, tempered, hardened whole cereal particles into soft, pliable, cohesive shreddable pieces. In double shredding, the hardened particles are first shred into discontinuous shreds, and then the discontinuous shreds are shred into continuous shreds. However, use of a pelletizer is preferred for more efficient production of continuous shreds.

The whole grain-containing pellets may preferably be immediately or quickly, for example within about 20 minutes, preferably within about 10 minutes, transported to a shredding or flaking operation so as to avoid any substantial hardening of or skin formation on the soft, pliable pellets. In embodiments of the invention, the whole grain pellets may be transferred by means of pneumatic conveyors or belt conveyors and/or bucket elevators to a hopper which feeds a screw conveyor. The latter may transfer the whole grain pellets to a series of shredding rolls or mills via flow tubes or hoppers or pneumatic conveyors. An example of such a screw conveyor is that made by the Screw Conveyor Corporation, 704 Hoffman Street, Hammond, Ind. 46327. The moisture content of the whole grain-containing pellets for shredding may range from about 29% by weight to about 42% by weight, preferably from about 33% by weight to about 38% by weight, based upon the weight of the pellets, for shreddability into strong, continuous shreds.

Any conventional milling system can be used in the present invention. A conventional milling system for making a wafer or biscuit may be employed in producing the shredded products such as ready-to-eat cereals, biscuits, and snack chips in accordance with the present invention. The conventional milling system can comprise a pair of closely spaced rolls that rotate in opposite directions with at least one of the rolls having circumferential grooves. Upon passing between the rolls, the dough is formed into long individual strings or strands. A circumferentially grooved roll can also be grooved transversely to the circumferential grooves for the production of a net-like sheet. When sheets are formed, the sheets are comprised of interwoven shreds or strings. When the rolls are held tightly together, the shreds or filaments partially separate from each other but are more or less connected. When the rolls are sprung slightly apart under pressure, the adjacent filaments can be united to each other by very thin webs or fins which stretch between them.

Upon passing between the rolls, the dough is deformed into the circumferential grooves and the optional crosshatching grooves. Each pair of rolls produces dough layer having a plurality of generally parallel longitudinal strands and optionally a plurality of crosshatchings generally perpendicular to the strands. The crosshatchings and the longitudinal strands form an integral net-like sheet. The texture of each layer may be controlled by the number of crosshatchings in each layer forming the net-like sheets. The net-like sheets are preferably unwebbed or webless, i.e., the crosshatchings and longitudinal strands of each layer are not connected by a membrane. The use of an open space within the area formed by the longitudinal strands and the crosshatchings in the outer layers provides a more attractive product. Additionally, use of the open space in the inner layers avoids an excessively dense texture.

The longitudinal strands are produced by the circumferential grooves and may run in parallel with the direction of movement of an underlying conveyor. The crosshatchings of the dough layer are produced by the crosshatching grooves and may run generally perpendicular to the direction of movement of the conveyor.

The shredding mills may be arranged in a linear series along the common underlying conveyor. Each of the shredded dough layers or sheets may be deposited on the conveyor in super-position, with their longitudinal strands running in the same direction.

Conventional shredding systems which can be used in the process of the present invention are disclosed in U.S. Pat. Nos. 502,378; 2,008,024; 2,013,003; 2,693,419; 4,004,035; and 6,004,612; and Canadian Patent No. 674,046.

The first and last one or more shredded dough layers to be deposited or laminated may have a number of crosshatchings so as to provide a region of denser texture or higher density in the biscuit or chip. The first layer which is laid down upon the conveyor belt preferably has a sufficient number of cross-hatchings to provide a more stable bed for the depositing of subsequent shred layers. Additionally, the outside appearance of the product is enhanced by the presence of crosshatchings as is the initial impression of crispness upon eating. For a 5 inch diameter shredding roll, the number of crosshatchings may be about 45 or more, equally spaced about the roll. Five inch diameter rolls may generally have: (1) about 10 to 22 circumferential grooves per inch, and (2) up to about 120 equally spaced crosshatching grooves. Larger or smaller diameter rolls may also be used with about the same frequency of grooves as the five inch diameter rolls.

The dough layers which are deposited between the outer layers providing a denser texture or higher density may have a decreased number of crosshatchings so as to provide a region of lighter texture or lower density in the interior of the chip. The number of cross-hatchings in each layer may be the same or different.

In at least one embodiment of the invention, at least 30 percent of the total number of net-like sheets may provide one or more regions of dense texture or higher density. In preferred embodiments, each layer has the same number of cross-hatchings. In at least one embodiment of the invention, for increased durability; crispness, and visual appearance, 120 crosshatchings for a five inch diameter roll is preferred.

The depth of the circumferential and cross-hatching grooves of the shredding rolls may be from about 0.010 inch to about 0.10 inch, preferably from about 0.016 inch to about 0.075 inch. For example, in preferred embodiments the cross-hatching groove depth may be about 0.018 inch and the circumferential groove depth may be about 0.075 inch. Groove depths of less than about 0.010 inch tend to require too many layers to achieve a desired weight per piece. The net-like sheets when laminated upon one another, do not necessarily line up exactly so that one layer is superimposed exactly on another layer. The greater the number of layers, the more likely the openings in one net-like sheet will be at least partly covered by the shreds of another net-like sheet. Thus, increasing the number of layers to achieve a given piece weight tends to result in a denser laminate and loss of shred integrity upon compression in compression rolls. The use of groove depths greater than about 0.10 inch tends to result in too dense of a laminate which is difficult to bake or fry into a crisp, chip-like texture.

Generally, the total number of net-like sheets may range from one to 21 depending upon the type and size of shredded product. For example, large sized ready-to-eat breakfast cereal biscuits or wafers may contain from about 1 to about 21 net-like sheets, preferably from about 1 to about 21 net-like sheets. Smaller sized ready-to-eat cereal biscuits or wafers may contain from 1 to 7, preferably from 1 to 6 net-like sheets. The snack chips of the invention may have 1 to 7, preferably 1 to 5, most preferably 4 net-like sheets. If the number of sheets is less than two, continuous, consistent production tends to be disrupted. The laminate tends to stick to or slip on the belt or compression roll upon substantial compression of a laminate which is relatively thin prior to compression. Additionally, with too few layers, the fried or baked product tends to be too fragile for handling on mass production packaging equipment or for dipping. If the number of sheets or layers is greater than seven, upon compression to achieve a desirable, chip-like thinness, the laminate becomes too dense and difficult to bake or fry into a crispy texture. In addition, excessive compression may result in a loss of a distinctive, shredded appearance.

In at least one embodiment of the invention for producing a shredded whole grain-containing snack chip, or a thin, crisp ready-to-eat breakfast cereal, the whole grain laminate prepared via shredding may be compressed in accordance with the method and apparatus of U.S. Pat. No. 6,004,612 to Andreski et al. for "Production of Shredded Snacks with Chip-Like Appearance and Texture", the disclosure of which is herein incorporated by reference in its entirety. The apparatus and method of U.S. Pat. No. 6,004,612, may be used to obtain a whole grain shredded chip-like snack having a substantially uniform shredded net-like appearance and crisp, shredded texture by substantially compressing a laminate of whole grain net-like sheets of whole grain pellets obtained "in accordance with the present invention. As disclosed in U.S. Pat. No. 6,004,612, the compression substantially reduces or eliminates air pockets or interlayer spacing and enhances interlayer adhesion so as to prevent the development of a puffed, pillowed, or thick biscuit or cracker-like appearance. Even though the laminate undergoes substantial compression, substantially flat, unpuffed, chip-like products exhibit a substantially uniform shredded, net-like appearance upon their major surfaces. Additionally, individual shred layers are visually discernible in the baked or fried product when it is broken and viewed in cross-section. The strength of the laminate is sufficient to continuously undergo cutting, transferring, and packaging operations during mass production without tearing or breaking. Baked or fried chip-like shredded snacks are sufficiently strong for dipping into and scooping of dips or sauces without breaking. Additionally, chips made according to this process have a whole grain appearance, with portions of the hull or bran of the whole grains being visually apparent in numerous locations on the surface of shredded snack chips.

In embodiments of the invention, prior to compression, the thickness of the whole grain laminate may generally range from about 0.035 inch to about 0.20 inch. Generally, the thickness of the laminate is reduced by at least about 35%, generally from about 45% to about 60% of its thickness prior to compression. As disclosed in U.S. Pat. No. 6,004,612, compression of the laminate to substantially reduce its thickness may be achieved by passing it between at least one pair of counterrotating compression rolls while it is supported upon and transported by a conveyer belt. Where more than one pair of compression rolls are employed, the total thickness reduction may be approximately equally divided between the pairs of rolls. Use of a single pair of counterrotating compression rolls is preferred for achieving the substantial compression of the laminate.

Supporting the laminate upon a belt while it is being compressed helps to avoid excessive stretching and tearing or sticking of the laminate during compression and transport through the rolls. As disclosed in U.S. Pat. No. 6,004,612, each pair of counterrotating rolls may comprise a top roll which contacts the top surface of the laminate, and a bottom roll which contacts the bottom surface of the conveyer belt which supports the laminate. The nip or gap between the counterrotating rolls and their relative rotational speeds are set so as to substantially compress the laminate while avoiding: 1) substantial sticking of the laminate to the upper roll, or 2) substantial movement or slippage of the laminate relative to the belt, either of which would substantially disrupt or distort the shred pattern of the laminate as it is compressed. The bottom roll helps to maintain the linear speed of the separately driven conveyer belt as the top roll compresses the laminate against the top surface of the belt. The rotational speeds of the top and bottom rolls of a pair of counterrotating rolls may be at least substantially the same, or essentially the same, depending upon the relative diameters of the rolls. If different diameter rolls are used, their rotational speeds, or angular velocities, may be adjusted to provide at least substantially the same linear velocity.

As disclosed in U.S. Pat. No. 6,004,612, the laminate is compressed by the counterrotating rolls without cutting of the laminate or without molding of the laminate into individual pieces. The compression or thickness reduction is at least substantially uniform across the width of the laminate. The compression provides a thin, cooked, but dough-like compressed laminate and helps to prevent substantial puffing or expansion upon subsequent baking or frying. The thickness of the compressed laminate exiting the nip of the compression rolls is such so as to provide a thin, chip-like appearance upon baking or frying.

In embodiments of the present invention, generally the thickness of the compressed laminate may range from about 0.05 inch to about 0.12 inch, preferably from about 0.06 inch to about 0.10 inch, for example from about 0.07 inch to about 0.09 inch.

Even though the thickness of the laminate is substantially reduced, a substantially uniform shred pattern is visually apparent upon the opposing major surfaces of the baked or fried product. Additionally, at least substantially all, or all of the individual shred layers are generally visible to the naked eye upon breaking a baked or fried piece perpendicularly to its major surfaces. For example, if a baked or fried piece is broken in about half, a cross-sectional viewing of each piece may generally reveal the same number, or substantially the same number, of shred layers or net-like sheets as were present prior to compression.

The moisture content of the laminate prior to compression and after compression is generally at least substantially the same. Moisture contents of the laminate prior to and after compression may range from about 29% by weight to about 42% by weight, preferably from about 33% by weight to about 38% by weight. The starch of the laminates may be in the form of agglomerated starch clusters with virtually no individual starch granules, as determined using light microscopy starch characterization with Lugol's Iodine.

The whole grain laminates of shredded dough strands, layers or net-like sheets may then be cut, and slit using conventional equipment, such as rotary cutters and slitters. Dockering of the laminate is not necessary to prevent puffing or leavening. For at least one embodiment of the invention, a non-dockered piece is preferable because it is more chip-like in appearance. Also, dockering of a compressed laminate tends to produce excessively dense portions which are difficult to bake or fry out without scorching.

The cutting operation may partially or completely cut the whole grain laminates into strips. The slitting operation may completely cut or score the strips so as to provide scored strips of unbaked or unfried ready-to-eat cereal biscuits or snacks with the unbaked or unfried biscuits or snacks tenuously connected to each other. In embodiments of the invention, the non-compressed or the compressed whole grain laminate may be edge trimmed and then partially cut into shaped pieces by a rotary cutter without substantial generation of scrap or recycle material. Then, the partially-cut laminate may be cut longitudinally in the direction of movement of the conveyer belt, and then transversely to the direction of movement of the conveyer belt without substantial generation of scrap or recycle material. After baking or frying and before or after oil or seasoning addition to the strips, the conveyor movement, etc., breaks apart the scored strips to provide individual pieces of shredded product such as ready-to-eat cereals, biscuits, wafers, or chip-like snacks.

The shape of the shredded products may be square, round, rectangular, elliptical, parallelepiped, triangular, jig saw puzzle shapes and the like. Shapes which minimize or eliminate waste or recycle are preferred. A most preferred shape-for a chip-like snack is a triangular or substantially triangular shape. As disclosed in U.S. Pat. No. 6,004,612, to essentially eliminate waste, the triangles may be formed using a rotary cutter which cuts the compressed laminate so that the base of each triangle is parallel to the longitudinal axis or direction of movement of the laminate. To reduce breakage during and after cutting, the laminate is preferably cut so that the apex or point of a triangle in one row does not touch or intersect the apex or point of another triangle located in an adjacent row. In preferred embodiments, the cutter may cut the laminate into a plurality of longitudinal rows of triangular-shaped pieces so that the apex of a triangular piece of one row is located at or intersects about the midpoint of the base of a triangular piece of an adjacent row as shown in U.S. Pat. No. 6,004,612.

As disclosed in U.S. Pat. No. 6,004,612, it is also preferable to form or cut the triangular pieces with rounded, blunted or flat corners so as to eliminate sharp points which may break-off during rotary cutting or subsequent slitting or transferring of the cut laminate. For example, vacuum may be used for lifting and transferring a partially cut laminate from one conveyer belt to another. The presence of substantial amounts of broken-off points may clog the vacuum equipment. One or more, preferably all three corners or apexes of the triangular pieces may be rounded, flattened or blunted. For example, to obtain flattened or blunted corners on a substantially equilateral or isosceles triangular shaped piece, each corner may be formed, cut, or shaped at least substantially parallel to its opposing side or at least substantially perpendicular to an adjacent side by the rotary cutter.

The cut, whole grain laminate obtained via the shredding process route may be dried, baked, fried, and/or toasted in conventional equipment. Suitable ovens for drying, baking and toasting the cut laminate include Proctor & Schwartz, Wemer-Lehara, Wolverine and Spooner ovens containing forced air and gas fired burners and a conveyor. Suitable equipment for frying include Heat and Control, FMC/Stein oil fryers. The laminates may be toasted to enhance the flavor and brown the edges of the shredded products. Baking or frying of compressed laminates does not substantially puff or leaven them and provides a substantially flat, thin, chip-like appearance.

Temperature profiles used for drying, baking, frying and toasting of the laminated preforms may generally be within the range of about 200° to about 700° F. The baking is preferably performed in a zoned oven using low oven velocity to avoid excess curling, separating or warping of the strips during baking. The total time for drying, baking, frying and/or toasting may be such so as to avoid browning (except on the edges of the pieces). It depends upon the number of shred layers, the size of the shredded product and the type of oven. The total time for drying, baking, frying and/or toasting may range from about 1 minutes to about 10 minutes. The cut, whole grain laminate may be fried and toasted in conventional frying and toasting equipment Heat and Control of Hayward, Calif. and FMC/Stein of Sandusky, Ohio make suitable fryers, which may have direct or indirect heated oil and a conveyor. The temperature profiles used in the fryer for frying and/or toasting may generally be within the range of 300° F. to 400° F. The total time for frying and/or toasting is preferably less than 3 minutes, and the final moisture of the resulting product is typically about 1-3% by weight. If the moisture of the resulting product is above about 3% by weight, then crispness may suffer; and if the moisture is less than about 1% by weight, then the product may have excessive oiliness, a darker color, and a scorched flavor. After baking or frying, the starch of the products may be in the form of agglomerated starch clusters with virtually no individual starch granules, as determined using light microscopy starch characterization with Lugol's Iodine.

The flakes obtained from the flaking process route may be baked via toasting by suspending them in a hot air steam, rather than by laying them onto a flat baking surface, in a generally conventional manner. The ovens used for toasting the flakes may be sloped from the feed end to the discharge end, and are perforated on the inside to allow air flow. These perforations usually are large as possible for good air flow but small enough so that flakes cannot catch in them. The toasted flakes are then cooled and sent to packaging.

The color of the final baked or fried shredded or flaked product may be a substantially uniform off white to golden tan color. The product may be topped with salt (for example, 0.5 to 2 weight percent, based on the total product weight) prior to baking or frying. The salt provides flavor and flavor enhancement. Some of the salt (NaCl) can be replaced with KCl or other salt substitutes.

Fat or shortening, when used in embodiments of the invention can be applied, preferably by spraying in oil form, to the top and bottom surfaces of baked or fried strips of snacks having no added fat or having only fat inherent in the cereal grain. For example, whole wheat berries generally have an inherent fat content of about 2% to 4% by weight. See, *Wheat: Chemistry and Technology*, Vol. II, Pomeranz, ed., Amer. Assoc. of Cereal Chemists, Inc., St. Paul, Minn., p. 285 (1988). In embodiments of the invention, the topical application of oil to baked or fried snacks having no other added fat may result in baked or fried products having a total fat content of less than about 20% by weight, preferably less than about 10% by weight. In other embodiments the amount of topically applied oil may be less than about 8% by weight, for example less than about 6% by weight, based upon the weight of a chip-like, shredded snack. Use of a hydrocolloid gum provides for obtaining a slippery or smooth mouthfeel and a glossy appearance even with no added fat.

Whole grain shredded or flaked composite products of the present invention may contain one or more additives (e.g., vitamins, minerals, colorants, flavorants, etc.) at effective levels of concentration. Exemplary thereof are sugars such as sucrose, fructose, lactose, dextrose, and honey, polydextrose, dietary fiber, seasonings, such as onion, garlic, parsley/other herbs, and bouillon, malt, wheat germ, nuts, cocoa, flavorants such as fruit flavoring, cracker flavoring, cinnamon, and vanilla flavoring, any acidulants such as citric acid, lactic acid, malic acid and other preservatives such as TBHQ, antioxidants such as tocopherol and BHT, food colorant, emulsifiers such as Myvatex 7 (a blend of distilled monoglycerides manufactured by Eastman Kodak), sodium stearoyl lactylate, lecithin, and polysorbate 60, and vitamins and/or minerals. Examples of suitable vitamins and minerals include B-complex vitamins, soluble iron compounds, calcium sources such as calcium carbonate, vitamin A, vitamin E, and vitamin C. Also, non-fat dry milk solids. (i.e., milk powder) or soybean protein may be added in an amount sufficient to create a final protein level of from about 10 to about 20 weight percent. Such additional ingredients may range up to about 30 weight percent, based on the total dry weight of the final product.

Additives, such as vitamins and minerals, may be dry blended with an optional hydrocolloid gum and then the dry blend may be admixed with the cooked; tempered whole grain particles. In other embodiments, enrichment with vitamins and minerals and/or other additives may be achieved by blending with the blended grain and optional gum mixture. For example, a dry multi-vitamin premix may be added with simultaneous mixing to a gum coated grain mixture at the entry of a screw conveyor to form a homogeneous composition. The resulting composition may be fed or dropped into a hopper, which supplies milling rolls. The multi-vitamin and optionally gum-coated grain composition may then be milled in shredding rolls and formed into shredded products.

Additives or fillings, particularly those which may adversely affect shredding, may also be incorporated into the shredded baked or fried goods of the present invention by depositing them between shred layers during formation of the dough laminate. For instance, salt, sucrose, fructose, lactose, dextrose, polydextrose, fiber, milk powder, cocoa, and/or flavorants are exemplary of additives which may be deposited on the baked or fired goods. Exemplary fillings for inter-shred layer deposition include fruit paste fillings, vegetable paste fillings, no-fat cheese powder fillings, confectionery fillings, and the like. The additives or fillings may be full-fat, no-fat, reduced-fat or low fat.

Additives may also be topically applied to the laminated structure before or after baking or frying. For instance, seasonings, oils, flavorants, fortifying agents, and/or preservatives may be topically applied to the baked or fried goods. In the production of whole grain shredded snacks, additives are preferably topically applied rather than applied between layers so as to not adversely affect a thin, chip-like appearance. Topically applied oil may be used as a carrier for one or more additives, such as flavorants or seasonings. Topical application of additives may be achieved using conventional dispensing apparatus such as disclosed in U.S. Pat. No. 5,707,448 to Cordera et al., for Apparatus for the Application of Particulates to Baked Goods and Snacks, and the disclosure of which is herein incorporated by reference in its entirety.

As indicated in FIG. 1, an alternative process route to shredding/forming/cutting is flaking. Flaking can be performed on the pellets exiting the pelletizer station using conventional equipment generally used for flaking whole grain pellets in cereal flake production and the like. For instance, the pellets can be conveyed between pairs of very large metal rolls that press them into very thin flakes. As other alternatives, the pellets also may be puffed. For example they may be gun-puffed, such as by using conventional manual single-shot guns, automatic single-shot guns, automatic multiple shot guns, or continuous guns, used for gun-puffing cooked whole grains in cereal production. The pellets also may be oven-puffed, particularly if the whole grain content comprises cooked rice and/or corn, which can inherently puff in the presence of high heat and proper moisture content. The puffed products can be directly packaged, or may be seasoned, fortified with vitamins/minerals, and/or coated with preservative before packaging. In other embodiments, production of filled products or half products using the pellets also may be provided, e.g., by feeding the pellets to a dual extruder in which the pellets may be used to form an enrobing layer that is filled with a different food material.

Shredded or flaked composite products of the present invention may have a moisture content of less than about 5% by weight, preferably about 0.5 to about 3 wt. %, more preferably about 1 to 2 wt. %, based on the total weight of the baked or fried, finished product. The final product may be baked or fried to a shelf stable relative humidity or "water activity" of less than about 0.7, preferably less than about 0.6. It may have a shelf stability of at least about 2 months, preferably at least about 12 months, when stored in proper, sealed packaging.

The following examples further illustrate the present invention wherein all parts and percentages are by weight and all temperatures are in of, unless otherwise indicated.

EXAMPLE 1

Multi-whole grain shredded snack: The ingredients and their relative amounts that may be used to produce a thin, crisp, chip-like, multi-whole grain shredded snack are:

| Ingredient | Amount (Weight %) |
|---|---|
| Pre-ground whole wheat (about 13% by weight water) | 17.35 |
| Pre-ground whole brown rice (about 13% by weight water) | 17.35 |
| Pre-ground whole oat groats (about 13% by weight water) | 17.35 |

-continued

| Ingredient | Amount (Weight %) |
|---|---|
| Pre-ground whole yellow corn (about 13% by weight water) | 17.35 |
| Salt | 0.19 |
| Water | 30.41 |
| TOTAL | 100.00 |

A pre-ground multi-whole grain combination may be prepared by separately Fitzmilling the raw whole grains using a ⅛ inch round holes screen. Whole white corn or any other colored whole corn may be used instead of whole yellow corn for these examples. The water and salt may be premixed and added to a Lauhoff rotary steam pressure cooker. The water temperature may be about 170° F.-190° F. Then, all the Fitzmilled multi-whole grains may be incorporated into the pressure cooker at the same time in one step. The four pre-ground whole grains may be preblended or separately added to the pressure cooker at the same time. A substantially homogenous or uniform blend of the grains is preferably used. The mass in the cooker may then be heated with steam and cooked for about 15-30 minutes at a pressure of about 12-26 psig and a temperature of about 268° F. to about 275° F. to fully gelatinize the starch of the whole grain particles.

The cooked whole grain corn particles may then be discharged from the rotating cooker, and the cooled cooked material is Comilled using a 1 inch square screen to obtain small grits. The small grits may then be conveyed to a grit bin or curing (tempering) tank. The cooked multi-whole grains may be tempered in the grit bin for 1-3 hours, with a target tempering time of about 2 hours. The cooked, tempered whole grain particles may have a moisture content of about 35% by weight to about 38% by weight for shredding.

The cooked tempered multi-whole grains may be transferred to a Bonnet pelletizer having a solid or cut flight screw, internal and external knives, and a die plate having ¼ inch or 5/16 inch apertures and an open die area of about 38% to about 42%. The tempered grits may be formed into pellets at a pressure of about 450 psig to about 700 psig. The pelletizer cooling unit may be set to about 40° F. to cool the jacket of the pelletizer so the pellets exiting the pelletizer have a pellet temperature of about 105° F. to avoid potential stickiness issues at the downstream shredder, triangular cutter head, and smooth compression roll. Air may be introduced at the die cutter to disperse the pellets. The multi-whole grain pellets obtained from the pelletizer are soft, pliable and coherent, and may have a length of about ⅛ inch to about ¼ inch and a diameter of about ¼ inch to about 5/16 inch.

The discrete, free flowing multi-whole grain pellets may then be conveyed to a surge hopper for feeding to one or more shredding mills which are arranged in a linear series along a common conveyor. Each shredding mill may comprise a pair of counterrotating rolls held in mutual contact for the production of net-like sheets. The rolls of the mills may each have a groove depth of about 0.018 inch to 0.021 inch and 120 cross-hatching grooves.

The net-like cereal dough sheets produced by the shredding mills may be continuously deposited upon a continuous conveyor belt to form a multi-layer, e.g., four layer, whole grain laminate having a thickness of about 0.06-0.10 of an inch. While supported on the conveyer belt, the multi-layer laminate may be continuously compressed between smooth surfaced, non-grooved, stainless steel counterrotating compression rolls, such as disclosed in U.S. Pat. No. 6,004,612, to produce chip-like snacks. The compression rolls may have the same diameter and may be driven by a common drive at the same rotational speed. The linear speed of each compression roll may be the same and the linear speed of the belt may be about 1% slower than the linear speed of the compression rolls. The compression rolls may be moved or maintained in position by the use of air cylinders. Air cylinder pressures of about 60 psi to 80 psi may be used to maintain a desired gap between the rolls as the belt and laminate continuously pass between the counterrotating compression rolls. The gap between the upper roll surface and the top surface of the conveyer belt may be from about 0.06 inch to about 0.08 inch to obtain a compressed laminate having a thickness of about 0.06 inch to about 0.10 inch. The moisture content of the laminate prior to compression and the moisture content of the compressed laminate may be about 35% by weight to about 38% by weight.

The compressed multi-layer laminate is cut into discrete pieces of a desired shape and size. For example, the compressed laminate may be conveyed to an edge trimmer to trim the longitudinal edges. The trimmed, compressed laminate may then be conveyed to a rotary cutter having a plurality of circumferential rows of Teflon 7 coated triangular cutting or forming elements. The elements may partially cut or form the compressed laminate into rows of isosceles triangle shaped preforms, or other shaped preforms, having blunted or flattened corners. The triangular preforms are joined at their peripheries by a thin layer of dough resulting from only partially cutting or scoring of the compressed laminate. The partially cut compressed laminate may then be cut or slit longitudinally, and then cut transversely to the direction of movement of the laminate to form strips of scored, triangular dough preforms.

The multi-whole grain compressed laminate preforms may be transferred to a multizone band oven for drying, baking and toasting for about 1 to 7.5 minutes at temperatures ranging from about 200° F. to about 700° F. The baked product leaving the oven may have an end point moisture content of about 2% by weight, based upon the weight of the final product.

After exiting the oven, the baked product strips may be oiled and seasoned in a seasoning drum or tumbler. Soybean oil or other vegetable oils may be topically applied as a fine spray to the top and bottom of the baked snack preform strips, followed by the application of sweet or savory seasonings.

The baked preform strips may then be conveyed to packaging in a manner so that the scored strips of triangular snacks readily separate at the score line by motion, bumping, etc., into individual snack pieces. The snack pieces may be, e.g., isosceles triangle shaped with blunted or flattened corners. The base may be about 1.7 inches long or 2.54 inches, and the two sides may each be about 1.6 inches long or 2.60 inches long. The two blunted side portions perpendicular and adjacent to the base may each be about 0.1 inch long. The blunted side portion parallel to and opposite the base may be about 0.16 inch to about 0.30 inch long. The thickness of the baked snack piece may be about 0.08-0.16 inch. The baked snack pieces may have a thin, flat, chip-like appearance and crisp, chip-like texture. The top and bottom major surfaces may have a substantially uniform shred pattern or embossed or woven, shredded appearance and texture. Upon breaking the baked snack chips, the multiple (e.g., four) shred layers may be seen by the naked eye in cross-section. The snack chips may be used for hand-to-mouth snacking and may be used for dipping without breakage.

EXAMPLE 2

Whole grain shredded snack enrobed with chocolate: The ingredients and their relative amounts which may be used to produce a thin, crisp, chip-like, whole grain rice shredded snack are:

| Ingredient | Amount (Weight %) |
| --- | --- |
| Pre-ground brown rice (about 13% by weight water) | 73.89 |
| Salt | 0.25 |
| Water | 25.86 |
| TOTAL | 100.00 |

The pre-ground whole brown rice (regular or parboiled) may be prepared by Fitzmilling raw whole grain brown rice using a ⅛ inch round holes screen. The whole grain rice may be small, medium, or long grain rice type. The water and salt may be pre-mixed and added to a Lauhoff rotary steam pressure cooker. The water temperature may be about 170° F.-190° F. Then, the Fitzmilled whole rice may be added to the rotating cooker within about 60-70 seconds. The mass in the cooker may then be heated with steam and cooked for about 12-30 minutes at a pressure of about 12-26 psig and a temperature of about 268° F. to about 275° F. to fully gelatinize the starch of the whole grain rice particles.

The cooked whole grain rice particles may then be discharged from the rotating cooker, and the cooled cooked material is then Comilled using a 1 inch square screen to obtain whole grain rice small grits. The small grits may then be conveyed to a grit bin or curing (tempering) tank. The cooked whole grain rice grits may be tempered in the grit bin for 1 to 3 hours, with a target tempering time of about 2 hours. The cooked, tempered whole grain rice grits may have a moisture content of about 35% by weight for shredding.

The cooked tempered whole grain rice grits may be transferred to a Bonnet pelletizer having a solid or cut flight screw, internal and external knives, and a die plate having 3/16 inch apertures and an open die area of about 38% to about 42%. The tempered agglomerates may be formed into pellets at a pressure of about 450 psig to about 700 psig. The pelletizer cooling unit may be set to about 40° F. to cool the jacket of the pelletizer so the pellets exiting the pelletizer have a pellet temperature of about 95° F. to about 105° F. to avoid potential stickiness issues at the downstream shredder, triangular cutter head, and smooth compression roll. Air may be introduced at the die cutter to disperse the pellets. The whole grain pellets obtained from the pelletizer are soft, pliable and coherent, and may have a length of about ⅛ inch to about ¼ inch and a diameter of about 3/16 inch.

The discrete, free flowing whole grain pellets may then be shred into a whole grain laminate, compressed, rotary cut, baked, and optionally seasoned, as in Example 1. The baked product (or baked and seasoned product) may then be enrobed with real chocolate coating or compound chocolate coating, or a combination of both. The baked product:chocolate coating ratio may be 50:50 to 40:60 wt %:wt %, respectively. The enrobed baked product can be packaged, such as described in Example 1.

EXAMPLE 3

Multi-whole grain and cheese shredded snack: The ingredients and their relative amounts that may be used to produce a thin, crisp, chip-like, multi-whole grain and cheese shredded snack are:

| Ingredient | Amount (Weight %) |
| --- | --- |
| Pre-ground whole wheat (about 13% by weight water) | 17.35 |
| Pre-ground whole brown rice (about 13% by weight water) | 17.35 |
| Pre-ground whole oat groats (about 13% by weight water) | 17.35 |
| Pre-ground whole yellow corn (about 13% by weight water) | 17.35 |
| Salt | 0.19 |
| Water | 30.41 |
| TOTAL | 100.00 |

Each of the four pre-ground whole grains may be prepared by separately Fitzmilling the raw whole grains using a ⅛ inch round holes screen. The water and salt may be pre-mixed and added to a Lauhoff rotary steam pressure cooker. The water temperature may be about 170° F.-190° F. Then, all the Fitzmilled multi-whole grains may be incorporated into the pressure cooker at the same time in one step. The four pre-ground whole grains may be preblended or separately added to the pressure cooker at the same time. A substantially homogenous or uniform blend of the grains is preferably used. The mass in the cooker may then be heated with steam and cooked for about 15-30 minutes at a pressure of about 15-26 psig and a temperature of about 268° F. to about 275° F. to fully gelatinize the starch of the multi-whole grain particles.

The cooked multi-whole grain particles may then be discharged from the rotating cooker, and the cooled cooked material is then Comilled using a 1 inch square screen to obtain multi-whole grain small grits. The small grits may then be conveyed to a grit bin or curing (tempering) tank. The cooked multi-whole grain small grits may be tempered in the grit bin for 1 to 3 hours, with a target tempering time of about 2 hours. The cooked, tempered multi-whole grain particles may have a moisture content of about 34.5% by weight for shredding.

The cooked tempered multi-whole grain small grits and natural cheese are blended together in a 90:10 wt %:wt % ratio, respectively. This blending of the multi-whole grain small grits and cheese may be performed before the introduction of these ingredients to a pelletizer, or, alternatively, these ingredients can be separately introduced in a feed zone of a pelletizer and for blending within the pelletizer. The cooked tempered grits and cheese blend may be pelletized in a Bonnet pelletizer having a solid or cut flight screw, internal and external knives, and a die plate having 3/16 inch apertures and an open die area of about 38% to about 42%. The tempered agglomerates may be formed into pellets at a pressure of about 450 psig to about 700 psig. The pelletizer cooling unit may be set to about 40° F. to cool the jacket of the pelletizer so the pellets exiting the pelletizer have a pellet temperature of about 95° F. to about 105° F. to avoid potential stickiness issues at the downstream shredder, triangular cutter head, and smooth compression roll. Air may be introduced at the die cutter to disperse the pellets. The whole grain/cheese composite pellets obtained from the pelletizer are soft, pliable and coherent, and may have a length of about ⅛ inch to about ¼ inch and a diameter of about 3/16 inch.

The discrete, free flowing multi-whole grain/cheese composite pellets may then be conveyed to a surge hopper for feeding to one or more shredding mills which are arranged in a linear series along a common conveyor, such as described in Example 1. Natural low moisture cheese may be added between the shredded layers or on top of the shredded layers. The net-like cereal dough sheets produced by the shredding mills may be continuously deposited upon a continuous conveyor belt to form a multi-layer, e.g., four layer, whole grain laminate having a thickness of about 0.06-0.10 of an inch. The multi-layer multi-whole grain/cheese composite laminate is compressed using a smooth roll, cut into discrete pieces of a desired shape and size, and baked and seasoned to produce a cheese-containing chip-like snack which can be packaged, such as described in Example 1.

EXAMPLE 4

Multi-whole grain and fruit shredded snack: The ingredients and their relative amounts that may be used to produce a thin, crisp, chip-like, multi-whole grain and fruit shredded snack are:

| Ingredient | Amount (Weight %) |
| --- | --- |
| Pre-ground whole wheat (about 13% by weight water) | 17.35 |
| Pre-ground whole brown rice (about 13% by weight water) | 17.35 |
| Pre-ground whole oat groats (about 13% by weight water) | 17.35 |
| Pre-ground whole yellow corn (about 13% by weight water) | 17.35 |
| Whole evaporated apples | 15.60 |
| Water | 15.00 |
| TOTAL | 100.00 |

Each of the four pre-ground whole grains may be prepared by separately Fitzmilling the raw whole grains using a ⅛ inch round holes screen. All the Fitzmilled multi-whole grains may be incorporated into the pressure cooker at the same time in one step. The evaporated apples may be mixed with the water and then blended with the pre-ground whole grains in a ribbon blender, and then the resulting mixture is introduced at the same time into a pressure cooker, such as in a Lauhoff rotary steam pressure cooker. A substantially homogenous or uniform blend of the grains and fruit is preferably used. The water temperature may be about 170° F.-190° F. The mass in the cooker may then be heated with steam and cooked for about 15-30 minutes at a pressure of about 15-26 psig and a temperature of about 268° F. to about 275° F. to fully gelatinize the starch of the multi-whole grain particles.

The cooked multi-whole grain particles/fruit mixture may then be discharged from the rotating cooker, and the cooled cooked material is then Comilled using a 1 inch square screen to obtain multi-whole grain small grits. The small grits may then be conveyed to a grit bin or curing (tempering) tank. The cooked multi-whole grain small grits may be tempered in the grit bin for 1 to 3 hours, with a target tempering time of about 2 hours. The cooked, tempered multi-whole grain particles may have a moisture content of about 34.5% by weight for shredding.

The cooked tempered multi-whole grain small grits and fruit combination is pelletized. The cooked tempered grits and fruit blend may be pelletized in a Bonnet pelletizer having a solid or cut flight screw, internal and external knives, and a die plate having 3/16 inch apertures and an open die area of about 38% to about 42%. The tempered agglomerates may be formed into pellets at a pressure of about 450 psig to about 700 psig. The pelletizer cooling unit may be set to about 40° F. to cool the jacket of the pelletizer so the pellets exiting the pelletizer have a pellet temperature of about 95° F. to about 105° F. to avoid potential stickiness issues at the downstream shredder, triangular cutter head, and smooth compression roll. Air may be introduced at the die cutter to disperse the pellets. The whole grain/fruit composite pellets obtained from the pelletizer are soft, pliable and coherent, and may have a length of about ⅛ inch to about ¼ inch and a diameter of about 3/16 inch.

The discrete, free flowing multi-whole grain/fruit composite pellets may then be conveyed to a surge hopper for feeding to one or more shredding mills which are arranged in a linear series along a common conveyor, such as described in Example 1. Whole fruit powder alone or in combination with sugar/condiments may be added between the shredded layers or on top of the shredded layers. Alternatively bakable fruit filling may be added between the layers to produce product with crunchy-chewy texture. The net-like cereal dough sheets produced by the shredding mills may be continuously deposited upon a continuous conveyor belt to form a multi-layer, e.g., four layer, whole grain laminate having a thickness of about 0.06-0.10 of an inch. The multi-layer multi-whole grain/fruit composite laminate is compressed using a smooth roll, cut into discrete pieces of a desired shape and size, and baked and seasoned to produce a fruit-containing chip-like snack which can be packaged, such as described in Example 1.

EXAMPLE 5

Multi-whole grain and vegetable shredded snack: The ingredients and their relative amounts that may be used to produce a thin, crisp, chip-like, multi-whole grain and vegetable shredded snack are:

| Ingredient | Amount (Weight %) |
| --- | --- |
| Pre-ground whole wheat (about 13% by weight water) | 14.33 |
| Pre-ground whole brown rice (about 13% by weight water) | 14.33 |
| Pre-ground whole oat groats (about 13% by weight water) | 14.33 |
| Pre-ground whole yellow corn (about 13% by weight water) | 14.33 |
| Dried whole vegetables | 18.75 |
| Frozen whole vegetables | 7.30 |
| Water | 16.63 |
| TOTAL | 100.00 |

Each of the four pre-ground whole grains may be prepared by separately Fitzmilling the raw whole grains using a ⅛ inch round holes screen. Frozen whole vegetables are thawed prior to use. All the Fitzmilled multi-whole grains may be incorporated into the pressure cooker at the same time in one step. The thawed vegetables and dried vegetables may be mixed with the water and then blended with the pre-ground whole grains in a ribbon blender, and then the resulting mixture is introduced at the same time into a pressure cooker, such as in a Lauhoff rotary steam pressure cooker. A substantially homogenous or uniform blend of the grains and vegetables is preferably used. The water temperature may be about 170° F.-190° F. The mass in the cooker may then be heated with steam and cooked for about 15-30 minutes at a pressure of about 15-26 psig and a temperature of about 268° F. to about 275° F. to fully gelatinize the starch of the multi-whole grain particles.

The cooked multi-whole grain particles/vegetables mixture may then be discharged from the rotating cooker, and the cooled cooked material is then Comilled using a 1 inch square screen to obtain multi-whole grain small grits. The small grits may then be conveyed to a grit bin or curing (tempering) tank. The cooked multi-whole grain small grits may be tempered in the grit bin for 1 to 3 hours, with a target tempering time of about 2 hours. The cooked, tempered multi-whole grain particles may have a moisture content of about 34.5% by weight for shredding.

The cooked tempered multi-whole grain small grits and vegetables combination is pelletized. The cooked tempered grits and vegetable blend may be pelletized in a Bonnet pelletizer having a solid or cut flight screw, internal and external knives, and a die plate having 3/16 inch apertures and an open die area of about 38% to about 42%. The tempered agglomerates may be formed into pellets at a pressure of about 450 psig to about 700 psig. The pelletizer cooling unit may be set to about 40° F. to cool the jacket of the pelletizer so the pellets exiting the pelletizer have a pellet temperature of about 95° F. to about 105° F. to avoid potential stickiness issues at the downstream shredder, triangular cutter head, and smooth compression roll. Air may be introduced at the die cutter to disperse the pellets. The whole grain/vegetable composite pellets obtained from the pelletizer are soft, pliable and coherent, and may have a length of about ⅛ inch to about ¼ inch and a diameter of about 3/16 inch.

The discrete, free flowing multi-whole grain/vegetable composite pellets may then be conveyed to a surge hopper for feeding to one or more shredding mills which are arranged in a linear series along a common conveyor, such as described in Example 1. Whole vegetable powder alone or in combination with herbs/condiments may be added between the shredded layers or on top of the shredded layers. Alternatively bakable vegetable filling may be added between the layers to produce product with crunchy-chewy texture. The net-like cereal dough sheets produced by the shredding mills may be continuously deposited upon a continuous conveyor belt to form a multi-layer, e.g., four layer, whole grain laminate having a thickness of about 0.06-0.10 of an inch. The multi-layer multi-whole grain/vegetable composite laminate is compressed using a smooth roll, cut into discrete pieces of a desired shape and size, and baked and seasoned to produce a vegetable-containing chip-like snack which can be packaged, such as described in Example 1.

It will be understood that various changes in the details, materials, and arrangements of formulations and ingredients, which have been herein described and illustrated in order to explain the nature of the invention may be made by those skilled in the art within the principle and scope of the invention as expressed in the appended claims.

What is claimed is:

1. A method for producing a shredded composite food product, comprising:

cooking particles of whole cereal grain to provide a cooked whole cereal grain product;

tempering the cooked whole cereal grain product to provide a tempered product, the tempered product having retrograded starch;

adding a vegetable food component to the particles of the whole cereal grain or to the cooked whole cereal grain, before or during a pelletization step;

pelletizing the tempered product, the pelletizing to effect shear in an amount and at a temperature effective to provide composite food pellets having a texture that is softer and more pliable than prior to pelletization, a moisture content of about 33% to about 38% by weight, and a pellet temperature of about 80° F. to about 105° F., the composite food pellets comprising the vegetable food component;

shredding the composite food pellets having a moisture content of about 33% to about 38% by weight to provide shredded composite food sheets;
forming a shredded composite food laminate from the shredded composite food sheets; and
baking the shredded composite food laminate to obtain a shredded composite food product.

2. A method for producing a shredded composite food product as claimed in claim 1, wherein the whole grain particles comprise at least one member selected from the group consisting of rye, oats, rice, barley, corn, and triticale.

3. A method for producing a shredded composite food product as claimed in claim 2, wherein the vegetable food component comprises vegetables in a form selected from raw vegetables, frozen vegetables, evaporated vegetables, vegetable juices, vegetable purees, vegetable powders, and any combination thereof.

4. A method for producing a shredded composite food product as claimed in claim 2, wherein the whole cereal grain particles comprise a combination of different types of whole grain particles.

5. A method for producing a shredded composite food product comprising:
   a) providing a whole grain-containing mixture comprising cooked and tempered particles of whole cereal grain and a vegetable food component;
   b) pelletizing the whole grain-containing mixture in a pelletizer, the pelletizing to effect shear in an amount and at a temperature effective to provide composite food pellets having a texture that is softer and more pliable than prior to pelletization, a moisture content of about 33% to about 38% by weight, and a pellet temperature of about 80° F. to about 105° F.;
   c) shredding the composite food pellets having a moisture content of about 33% to about 38% to provide shredded composite food sheets;
   d) laminating the shredded composite food sheets to obtain a shredded composite food laminate;
   e) dividing the shredded composite food laminate into discrete composite food pieces; and
   f) baking the shredded composite food laminate prior to step e) or composite food pieces after step e) to obtain a shredded composite food product.

6. A method for producing a shredded composite food product as claimed in claim 5, wherein the whole grain particles comprise at least one member selected from the group consisting of rye, oats, rice, barley, corn, and triticale.

7. A method for producing a shredded composite food product as claimed in claim 6, comprising, prior to step a), providing the cooked and tempered whole grain particles by admixing whole cereal grain particles with water and pressure cooking the whole cereal grain particles to at least substantially gelatinize starch of the whole grain particles to provide cooked whole grain particles, and tempering the cooked, whole grain particles to provide the cooked and tempered whole grain particles.

8. A method for producing a shredded composite food product as claimed in claim 7, wherein the whole grain-containing mixture comprises a combination of whole grain particles and vegetables in a mixing ratio of about 20:80 to about 95:05, on a wt %:wt % basis, respectively.

9. A method for producing a shredded composite food product as claimed in claim 7, wherein the cooking is conducted at a temperature of at least about 250° F. at a pressure of about 15 psig to about 30 psig, and wherein the tempering is for about 0.5 hour to about 5 hours at a temperature of less than about 135° F.

10. A method for producing a shredded composite food product as claimed in claim 7, wherein providing the whole grain-containing mixture comprises combining a first food component selected from the group consisting of fruit and vegetables with at least one of i) the whole cereal grain particles prior to completion of the cooking thereof, and ii) the cooked and tempered whole grain particles before completing the pelletizing.

11. A method for producing a shredded composite food product as claimed in claim 10, wherein the moisture content of the cooked whole grain particles is from about 29% by weight to about 42% by weight, based upon the weight of the cooked whole grain particles.

12. A method for producing a shredded composite food product as claimed in claim 6, wherein the vegetable food component comprises vegetables selected from the group consisting of onions, sweet potatoes, potatoes, cabbage, carrots, spinach, broccoli, peas, beans, peppers, zucchini, okra, Brussels sprouts, cucumber, tomatoes, and any combinations thereof.

13. A method for producing a shredded composite food product as claimed in claim 6, wherein the vegetable food component comprises vegetables in a form selected from raw vegetables, vegetable juices, vegetable purees, vegetable powders, and combinations thereof.

14. A method for producing a shredded composite food product as claimed in claim 6, wherein the whole cereal grain particles comprise a combination of different types of whole grain particles.

15. A method for producing a shredded composite food product as claimed in claim 6, wherein the pelletizing effects shear in an amount and at a temperature effective to reduce retrogradation of the starch of the tempered whole grain particles to increase their shreddability.

16. A method for producing a shredded composite food product as claimed in claim 6, wherein the pelletizing is at a pressure of about 200 psig to about 700 psig and the pelletizing temperature is controlled to provide a pellet temperature of from about 80° F. to about 105° F. upon exiting the pelletizer.

17. A method for producing a shredded composite food product as claimed in claim 6, wherein the composite food pellets have a length of about ⅛ inch to about ¼ inch and a diameter of about 3/16 inch to about 5/16 inch and are produced by extrusion through a pelletizer extrusion die having a plurality of apertures, wherein the extrusion die has an open area of about 25% to about 45%.

18. A method for producing a shredded composite food product as claimed in claim 6, wherein said whole grain particles are obtained by comminuting whole grains or kernels to a particles size of about 0.05 inch to about 0.20 inch.

19. A method for producing a shredded composite food product as claimed in claim 6, wherein the shredded composite food laminate is compressed to a thickness of about 0.05 inch to about 0.12 inch and the compressed shredded composite food laminate is cut into pieces.

20. A method for producing a shredded composite food product as claimed in claim 6, wherein whole soy seeds or comminuted whole soy seeds are admixed with the whole grain particles.

21. A method for producing a coated, shredded food product, comprising:
   cooking particles of whole cereal grain to provide a cooked whole cereal grain product;
   tempering the cooked whole cereal grain product to provide a tempered product, the tempered product having retrograded starch;

pelletizing the tempered product, the pelletizing to effect shear in an amount and at a temperature effective to provide food pellets having a texture that is softer and more pliable than prior to pelletization, a moisture content of about 33% to about 38% by weight, and a pellet temperature of about 80° F. to about 105° F.;

shredding the food pellets having a moisture content of about 33% to about 38% by weight to provide shredded food sheets;

forming a shredded food laminate from the shredded food sheets;

dividing the shredded food laminate into discrete shredded food pieces; and baking the discrete shredded food pieces to obtain baked, shredded food substrates coating the baked, shredded food substrates with a coating containing cocoa to provide coated, shredded food products.

22. A method for producing a coated shredded food product as recited in claim 21, wherein the whole grain particles comprise at least one member selected from the group consisting of rye, oats, rice, barley, corn, and triticale.

23. A method for producing a coated shredded food product as recited in claim 21, wherein the pelletizing is at a pressure of about 200 psig to about 700 psig and the pelletizing temperature is controlled to provide a pellet temperature of from about 80° F. to about 105° F. upon exiting the pelletizer.

24. A method for producing a shredded composite food product, comprising:

cooking particles of whole cereal grain to provide a cooked whole cereal grain product;

tempering the cooked whole cereal grain product to provide a tempered product, the tempered product having retrograded starch;

adding a food component selected from the group consisting of fruits, dairy cheese and combinations thereof, wherein if the food component comprises fruits it is added before or during a pelletization step, and if the food component comprises dairy cheese, the dairy cheese is added before or during the pelletization step but after the tempering step;

pelletizing the tempered product, the pelletizing to effect shear in an amount and at a temperature effective to provide composite food pellets having a texture that is softer and more pliable than prior to pelletization, a moisture content of about 33% to about 38% by weight, and a pellet temperature of about 80° F. to about 105° F., the composite food pellets comprising the food component; and shredding the composite food pellets having a moisture content of about 33% to about 38% by weight to provide a shredded composite food product.

25. A method for producing a shredded composite food product as claimed in claim 24, wherein the whole grain particles comprise at least one member selected from the group consisting of rye, oats, rice, barley, corn, and triticale.

26. A method for producing a shredded composite food product as claimed in claim 25, wherein the food component comprises fruit in a form selected from raw fruits, frozen fruits, evaporated fruits, fruit juices, fruit purees, fruit powders, and any combination thereof.

27. A method for producing a shredded composite food product as claimed in claim 25, wherein the food component comprises dairy cheese having a moisture content of less than about 20 wt %.

28. A method for producing a shredded composite food product as claimed in claim 25, wherein the whole cereal grain particles comprise a combination of different types of whole grain particles.

29. A method for producing a shredded composite food product as claimed in claim 25, wherein the pelletizing is at a pressure of about 200 psig to about 700 psig and the pelletizing temperature is controlled to provide a pellet temperature of from about 80° F. to about 105° F. upon exiting the pelletizer.

30. A method for producing a shredded composite food product as claimed in claim 25, wherein the pelletizing is at a pressure of about 200 psig to about 700 psig and the pelletizing temperature is controlled to provide a pellet temperature of from about 80° F. to about 105° F. upon exiting the pelletizer.

31. A method for producing a shredded composite food product, comprising:

cooking particles of whole cereal grain to provide a cooked whole cereal grain product;

tempering the cooked whole cereal grain product to provide a tempered product, the tempered product having retrograded starch;

adding a food component to the particles of the whole cereal grain or to the cooked whole cereal grain, the food component selected from the group consisting of fruits, and dairy cheese, wherein if the food component comprises fruits, the fruits are added before or during a pelletization step, and if the food component comprises dairy cheese, the dairy cheese is added before or during the pelletization step but after the tempering step;

pelletizing the tempered product, the pelletizing to effect shear in an amount and at a temperature effective to provide composite food pellets having a texture that is softer and more pliable than prior to pelletization, a moisture content of about 33% to about 38% by weight, and a pellet temperature of about 80° F. to about 105° F., the composite food pellets comprising the food component;

shredding the composite food pellets having a moisture content of about 33% to about 38% by weight to provide shredded composite food sheets;

forming a shredded composite food laminate from the shredded composite food sheets; and baking the shredded composite food laminate to obtain a shredded composite food product.

32. A method for producing a shredded composite food product as claimed in claim 31, wherein the whole grain particles comprise at least one member selected from the group consisting of rye, oats, rice, barley, corn, and triticale.

33. A method for producing a shredded composite food product as claimed in claim 32, wherein the food component comprises fruit in a form selected from raw fruits, frozen fruits, evaporated fruits, fruit juices, fruit purees, fruit powders, and any combination thereof.

34. A method for producing a shredded composite food product as claimed in claim 32, wherein the food component comprises dairy cheese having a moisture content of less than about 20 wt %.

35. A method for producing a shredded composite food product as claimed in claim 32, wherein the whole cereal grain particles comprise a combination of different types of whole grain particles.

36. A method for producing a shredded composite food product comprising:

a) providing a whole grain-containing mixture comprising cooked and tempered particles of whole cereal grain and a food component selected from the group consisting of fruit, and dairy cheese;
b) pelletizing the whole grain-containing mixture in a pelletizer, the pelletizing to effect shear in an amount and at a temperature effective to provide composite food pellets having a texture that is softer and more pliable than prior to pelletization, a moisture content of about 33% to about 38% by weight, and a pellet temperature of about 80° F. to about 105° F.;
c) shredding the composite food pellets having a moisture content of about 33% to about 38% to provide shredded composite food sheets;
d) laminating the shredded composite food sheets to obtain a shredded composite food laminate;
e) dividing the shredded composite food laminate into discrete composite food pieces; and
f) baking the shredded composite food laminate prior to step e) or composite food pieces after step e) to obtain a shredded composite food product.

37. A method for producing a shredded composite food product as claimed in claim 36, wherein the whole grain particles comprise at least one member selected from the group consisting of rye, oats, rice, barley, corn, and triticale.

38. A method for producing a shredded composite food product as claimed in claim 37, wherein the food component comprises fruit in a form selected from raw fruits, frozen fruits, evaporated fruits, fruit juices, fruit purees, fruit powders, and any combination thereof.

39. A method for producing a shredded composite food product as claimed in claim 37, wherein the food component comprises dairy cheese having a moisture content of less than about 20 wt %.

40. A method for producing a shredded composite food product as claimed in claim 37, wherein the whole cereal grain particles comprise a combination of different types of whole grain particles.

41. A method for producing a shredded composite food product as claimed in claim 37, wherein the pelletizing is at a pressure of about 200 psig to about 700 psig and the pelletizing temperature is controlled to provide a pellet temperature of from about 80° F. to about 105° F. upon exiting the pelletizer.

* * * * *